Dec. 7, 1926.

W. B. HARSEL ET AL

Re. 16,499

TIRE MAKING MACHINE

Original Filed Nov. 3, 1917 • 20 Sheets-Sheet 1

Inventors
Edward Nall, Deceased,
by Edith Alice Nall, Executrix,
and
William B. Harsel.

By R. S. Dropper
Attorney

Dec. 7, 1926.

Re. 16,499

W. B. HARSEL ET AL

TIRE MAKING MACHINE

Original Filed Nov. 3, 1917 20 Sheets-Sheet 2

Inventors
Edward Nall, Deceased,
by Edith Alice Nall, Executrix,
and
By William B. Harsel
R. S. Wright Attorney Dec. 7, 1926.

W. B. HARSEL ET AL

Re. 16,499

TIRE MAKING MACHINE

Original Filed Nov. 3, 1917 20 Sheets-Sheet 3

Inventors
Edward Nall, Deceased,
by Edith Alice Nall, Executrix,
and
William B. Harsel,
By R. S. Trapp Attorney Dec. 7, 1926.

W. B. HARSEL ET AL

Re. 16,499

TIRE MAKING MACHINE

Original Filed Nov. 3. 1917 20 Sheets-Sheet 4

Inventors
Edward Nall, Deceased,
by Edith Alice Nall, Executrix,
and
William B. Harsel.

By R S Wright Attorney

Dec. 7, 1926.
W. B. HARSEL ET AL
Re. 16,499
TIRE MAKING MACHINE
Original Filed Nov. 3, 1917 20 Sheets-Sheet 5
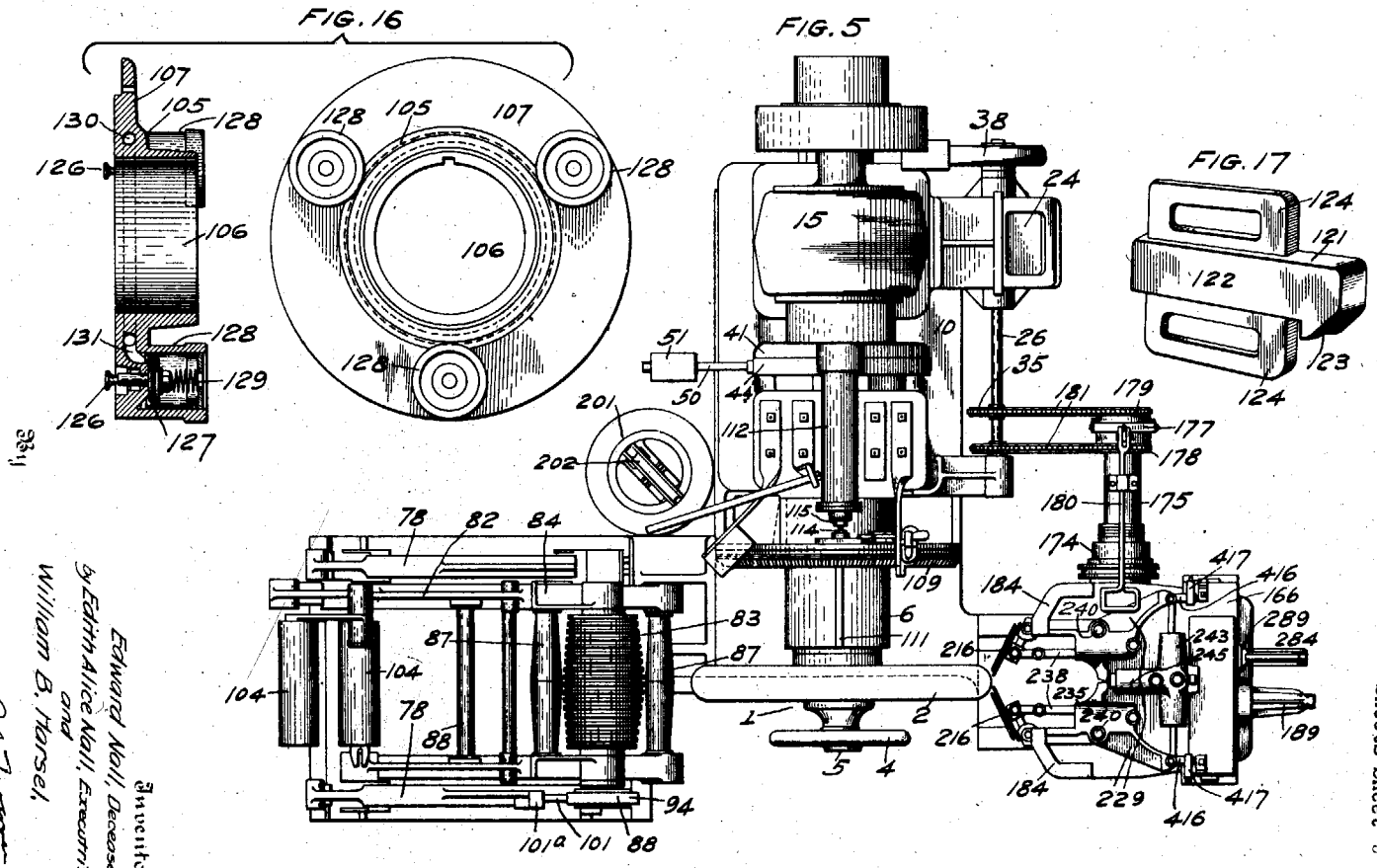
Inventors
Edward Nall, Deceased,
by Edith Alice Nall, Executrix,
and
William B. Harsel,
By
Attorney Dec. 7, 1926.

W. B. HARSEL ET AL

Re. 16,499

TIRE MAKING MACHINE

Original Filed Nov. 3, 1917 20 Sheets-Sheet 6

Inventors
Edward Nall, Deceased,
by Edith Alice Nall, Executrix,
and
William B. Harsel.

By R. Draper Attorney

Dec. 7, 1926. Re. 16,499

W. B. HARSEL ET AL

TIRE MAKING MACHINE

Original Filed Nov. 3, 1917 20 Sheets-Sheet 7

Inventors
Edward Nall, Deceased.
by Edith Alice Nall, Executrix.
and
William B. Harsel,
By R. S. Troper Attorney Dec. 7, 1926.
Re. 16,499
W. B. HARSEL ET AL
TIRE MAKING MACHINE
Original Filed Nov. 3, 1917 20 Sheets-Sheet 8
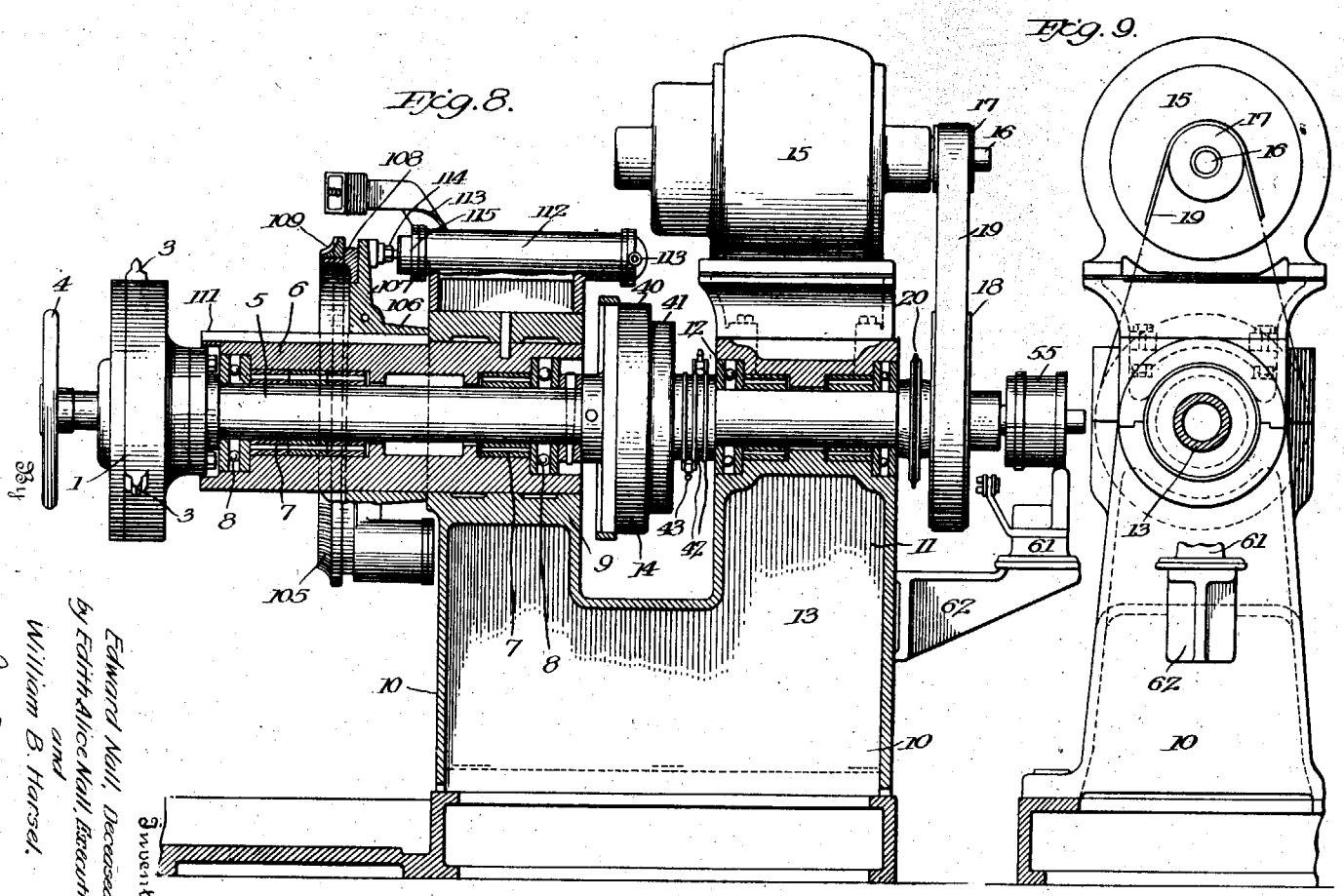
Inventors
Edward Nall, Deceased,
by Edith Alice Nall, Executrix,
and
William B. Harsel.
By R. S. Dragnet Attorney Dec. 7, 1926.

W. B. HARSEL ET AL

Re. 16,499

TIRE MAKING MACHINE

Original Filed Nov. 3, 1917 20 Sheets-Sheet 9

Inventors
Edward Nall, Deceased,
by Edith Alice Nall, Executrix,
and
William B. Harsel.

By R. O. Drogge Attorney

Dec. 7, 1926. Re. 16,499

W. B. HARSEL ET AL

TIRE MAKING MACHINE

Original Filed Nov. 3, 1917 20 Sheets-Sheet 10

Inventors
Edward Nall, Deceased,
by Edith Alice Nall, Executrix,
and
William B. Harsel.

By R. S. Drogen Attorney

Dec. 7, 1926. Re. 16,499

W. B. HARSEL ET AL

TIRE MAKING MACHINE

Original Filed Nov. 3, 1917 20 Sheets-Sheet 11

Inventors:
Edward Nall, Deceased,
by Edith Alice Nall, Executrix,
and
William B. Harsel.

By P. S. Dreyer Attorney

Dec. 7, 1926. Re. 16,499

W. B. HARSEL ET AL

TIRE MAKING MACHINE

Original Filed Nov. 3, 1917 20 Sheets-Sheet 12

Inventors
Edward Nall, Deceased,
by Edith Alice Nall, Executrix,
and
William B. Harsel.

By R. V. Frogue
Attorney

Dec. 7, 1926. Re. 16,499
W. B. HARSEL ET AL
TIRE MAKING MACHINE
Original Filed Nov. 3, 1917 20 Sheets-Sheet 13
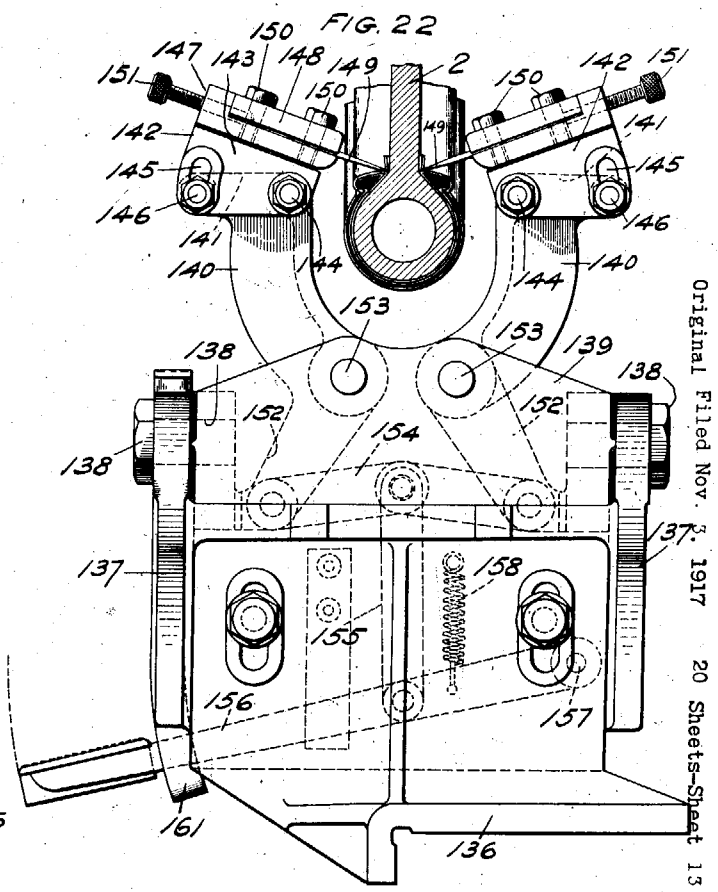
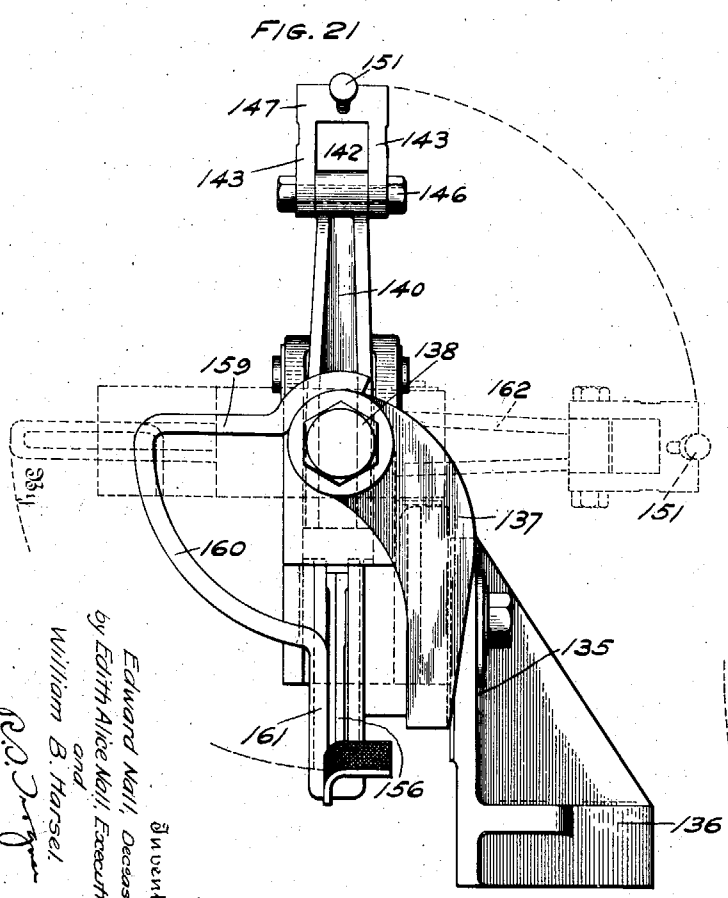
Inventors
Edward Nall, Deceased,
by Edith Alice Nall, Executrix,
and
William B. Harsel.
By R. D. Inglee
Attorney Dec. 7, 1926. Re. 16,499

W. B. HARSEL ET AL

TIRE MAKING MACHINE

Original Filed Nov. 3, 1917 20 Sheets-Sheet 14

Inventors

Edward Nall, Deceased,
by Edith Alice Nall, Executrix,
and
William B. Harsel.

By R. A. Frazer
Attorney

Dec. 7, 1926. Re. 16,499
W. B. HARSEL ET AL
TIRE MAKING MACHINE
Original Filed Nov. 3, 1917 20 Sheets-Sheet 15
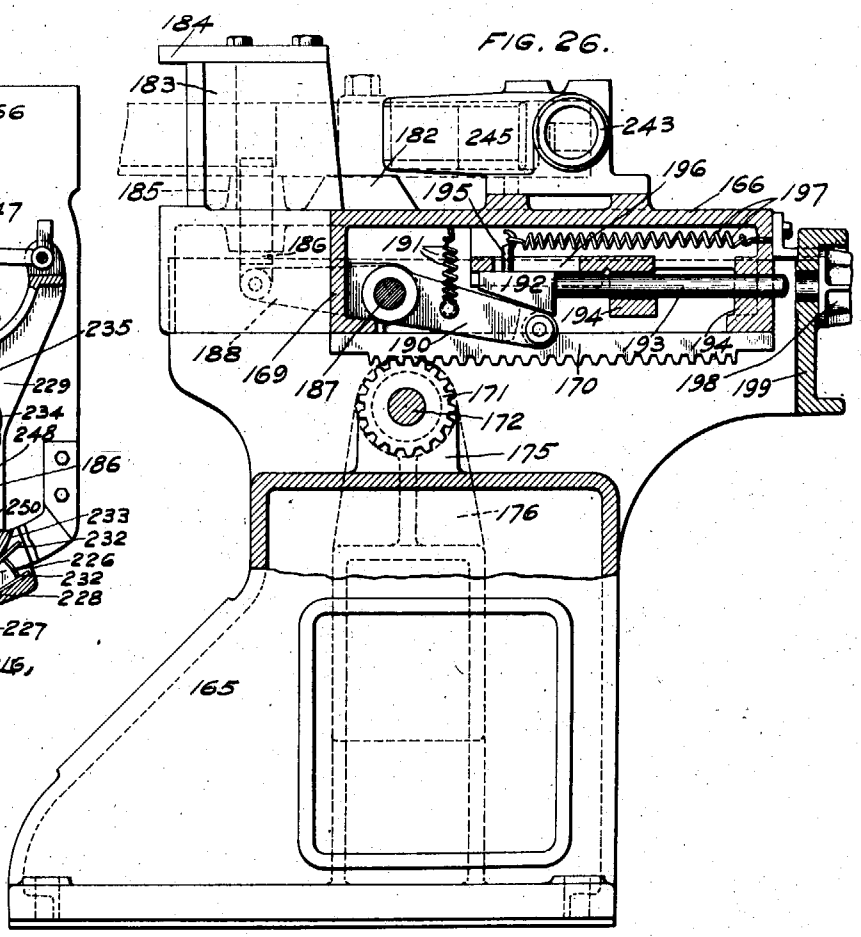
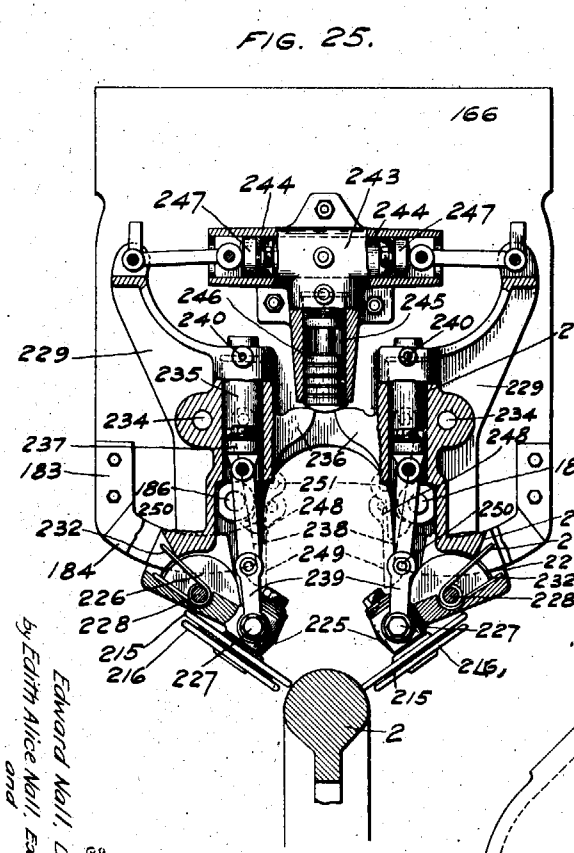
Inventors.
Edward Nall, Deceased,
by Edith Alice Nall, Executrix,
and
William B. Harsel.
By R. P. Thorpe
Attorney Dec. 7, 1926. Re. 16,499

W. B. HARSEL ET AL

TIRE MAKING MACHINE

Original Filed Nov. 3, 1917 20 Sheets-Sheet 16

Inventors
Edward Nall, Deceased
by Edith Alice Nall, Executrix,
and
William B. Harsel, By R. S. Magee
Attorney Dec. 7, 1926. Re. 16,499

W. B. HARSEL ET AL

TIRE MAKING MACHINE

Original Filed Nov. 3, 1917 20 Sheets-Sheet 17

Inventors
Edward Nall, Deceased,
by Edith Alice Nall, Executrix,
and
William B. Harsel.

By R. D. Hogan Attorney

Dec. 7, 1926. Re. 16,499

W. B. HARSEL ET AL

TIRE MAKING MACHINE

Original Filed Nov. 3, 1917 20 Sheets-Sheet 18

Inventors
Edward Nall, Deceased
by Edith Alice Nall, Executrix,
and
William B. Harsel, By R. O. Morgan Attorney Dec. 7, 1926. Re. 16,499

W. B. HARSEL ET AL

TIRE MAKING MACHINE

Original Filed Nov. 3, 1917 20 Sheets-Sheet 19

Inventors
Edward Nall, Deceased,
by Edith Alice Nall, Executrix
and
William B. Harsel,
By R. D. Rogers
Attorney Dec. 7, 1926.

Re. 16,499

W. B. HARSEL ET AL

TIRE MAKING MACHINE

Original Filed Nov. 3, 1917 20 Sheets-Sheet 20

Inventors
Edward Nall, Deceased,
by Edith Alice Nall, Executrix,
and
William B. Harsel, By Attorney Reissued Dec. 7, 1926. Re. 16,499

UNITED STATES PATENT OFFICE.

WILLIAM B. HARSEL, OF AKRON, AND EDWARD NALL, DECEASED, LATE OF AKRON, OHIO; BY THE GOODYEAR TIRE & RUBBER COMPANY, ASSIGNEE.

TIRE-MAKING MACHINE.

Original No. 1,395,183, dated October 25, 1921. Serial No. 200,185, filed November 3, 1917. Renewed November 18, 1920, Serial No. 425,026, and part of original No. 1,395,055, dated October 25, 1921. Original application filed November 3, 1917, Serial No. 200,185. Divided and application filed September 25, 1918, Serial No. 255,651. Application for reissue filed October 24, 1923. Serial No. 670,621.

This invention relates to tire-making and more especially to carcass-making machines, and constitutes an improvement on the machine forming the subject-matter of our companion application, Serial No. 200,186 filed Nov. 3, 1917.

In general, the objects of the invention are primarily the same as in our original machine; the distinction between the two residing principally in the fact that the present structure is even more automatic in its operations than is our original and, besides, it includes certain important refinements and novel features developed in the practical use of the original. With it, as with the first machine, it is possible to insure a high degree of uniformity of product; it permits of convenient control of its various mechanisms and parts; and it greatly simplifies the manufacture of tire-carcasses. These as well as other dominating features of the machine, and the practical advantages thereof, will become more apparent from the following description.

In order that this invention may be fully comprehended, we have disclosed the same in the appended drawings which are, however, to be understood as illustrative and as exemplifying one of many possible embodiments and utilizations.

In the drawings:

Fig. 5 is a view in top plan of a portion of the machine;

Fig. 8 is a view in longitudinal cross-section through the tire-core support, its supporting shaft, and the drive-mechanism therefor;

Fig. 9 is a view in end elevation of the same subject matter;

Fig. 16 is a view in combined plan and cross-section of the machine-positioned bead-setter ring;

Fig. 17 is a detail view in perspective of one of the grip-hooks through the medium of which two bead setter-rings are pneumatically compressed upon the tire-carcass;

Fig. 21 is a view in front elevation of the trimmer mechanism;

Fig. 22 is a view in side elevation of the same;

Fig. 25 is a view in top plan, partly in horizontal section, of the fabric-manipulating devices with their control-mechanism;

Fig. 26 is a view in partial longitudinal section of the carriage-supporting pedestal;

Figure 1:
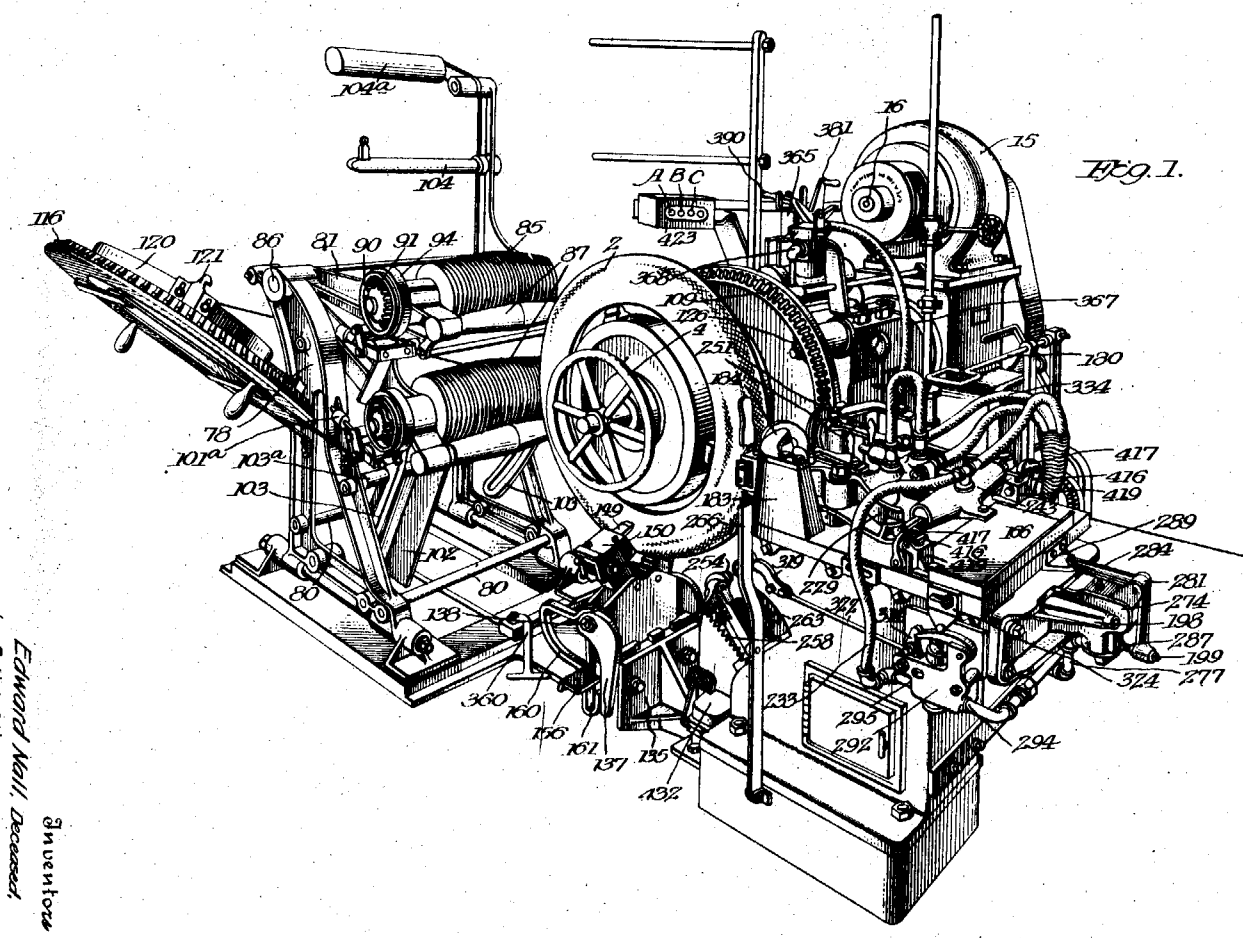
Fig. 1 is a view in isometric perspective of a machine constructed in accordance with our invention.

The carcass-building machine contemplated by the present improvement preferably includes certain primary machine-structures, namely, a tire-building core or form and its operating mechanism; a fabric-manipulating mechanism positionable in relation to the tire core; and a stock-rack for supplying fabric to the core for treatment thereon by the fabric-manipulating mechanism. Adjunctive to these structures are bead-setting and trimming mechanisms, etc.

In the drawings, corresponding reference characters indicate corresponding parts in the several views.

*1. General supporting structure.*—The various mechanisms and devices hereinafter described are preferably sustained by a general supporting structure which includes a machine frame or base of any desired form and dimensions.

Figure 10:
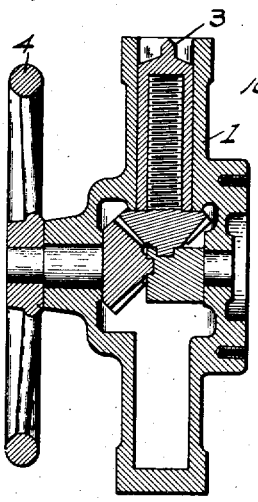
Fig. 10 is a detail view in cross-section of the mounting chuck for the tire-core.

*2. Core-supporting structure and core-drive.*—Any appropriate type of structure may be employed, such as a support or chuck 1 to sustain a tire-core or form 2, this chuck being of ordinary construction, comprising arms 3, Fig. 10, extensible from the chuck by any desirable mechanical mechanism manually controllable by the operator through a hand-wheel 4. This chuck is mounted upon the extremity of a chuck-supporting shaft 5 (Fig. 8) supported in an elongated bearing-member 6 carrying roller and end-thrust bearings 7 and 8. This bearing-member projects forwardly from a saddle or supporting standard 9 formed as a part of the main machine pedestal 10. A second saddle or supporting standard 11 on the base pedestal 10 is similarly provided with bearing members 12 in which is journaled a drive-shaft 13.

The shafts 5 and 13 are in axial alinement and are adapted to be connected, as by a solenoid clutch 14. The standard 11 supports an electric drive-motor 15 which is the prime mover of the machine. An armature-shaft 16 of this motor carries a drive-pulley 17. This pulley and a larger drive-pulley 18 (carried at the rear of the drive-shaft 13) are driven by a belt 19. The drive shaft 13 carries a sprocket-wheel 20 arranged to drive a similar sprocket 21 (Fig. 7) carried by an auxiliary or intermediate drive-shaft 22, by a chain 23.

The auxiliary drive-shaft 22 is supported within a casing or gear-box 24 (Fig. 7) mounted on one side of the pedestal 10, and has a pinion 25 keyed thereon interiorly of the gear-box. A countershaft 26 is supported upon the same side of the pedestal 10, one extremity of this countershaft projecting through the gear-box 24, and the other shaft-end being journaled within a bearing 27 supported upon the fore portion of the pedestal. Within the gear-box 24 is a sleeve 28 loosely mounted upon the countershaft 26 and carries a large gear 29 and a small drive-pinion 30. The former meshes with the pinion 25 and the latter has an operable engagement with a large drive-gear 31 loosely mounted in a similar manner upon the auxiliary shaft 22 through the medium of a sleeve 32. This sleeve is elongated and supports a pinion 33 in addition to the drive-gear 31, such pinion meshing with a drive-gear 34 fast on the counter shaft 26.

By utilizing the compact train of gearing, thus described, the peripheral speed of the main drive-shaft 13 is geared down from approximately one hundred and forty revolutions per minute to one or two revolutions per minute for the countershaft 26. This is necessary for the reason that the driving power required by the shaft which controls the advancement of a presser-supporting carriage (presently to be described) toward the tire-core is taken from the shaft 26. Sprockets 35 and 36 are employed upon the countershaft 26 to this end. The core 2 is driven at a much higher rate of speed in order to save time. The gearing, etc., are preferably housed in casings 37 and 38, and a belt tightener is also provided.

The solenoid-clutch 14 preferably includes mating-members 40 and 41 (Figs. 7 and 8) carried on the adjacent extremities of their respective shafts 5 and 13. The member 41 is electrically energized to attract the member 40 and make a connection between the shaft extremities in order that the drive of the shaft may be imparted to the chuck-supporting-shaft 5. Collector rings 42 and brushes 43 are provided upon the shaft 13 adjacent the clutch member 41.

Figure 11:
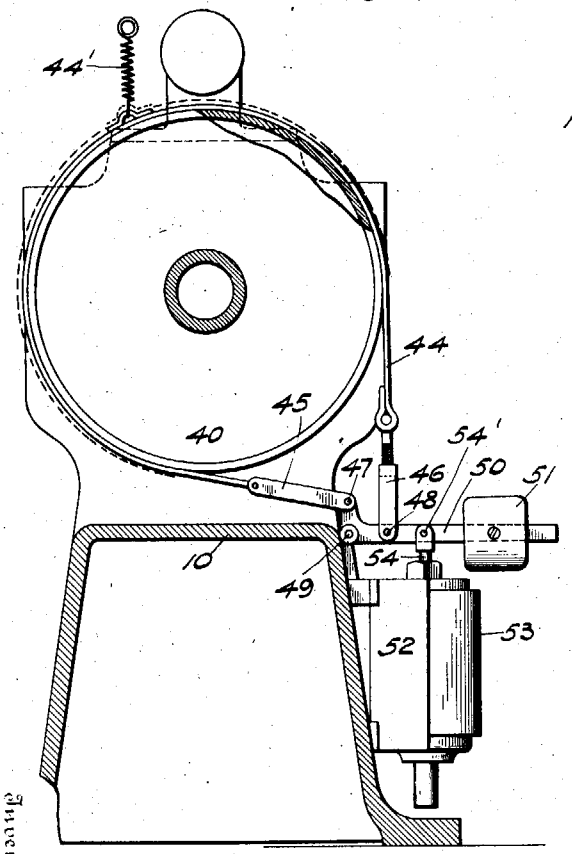
Fig. 11 is a view in cross-section of a detail of the automatic electro-mechanical brake device for the main drive-shaft.

It is an important desideratum that the operator of the machine shall be able to stop the rotating tire-core instantly at any desired point merely by cutting off the supply of electromotive force to the clutch member 41 and without allowing the core-shaft to lose its speed by running down or causing any braking of the motor shaft. To this end, it is desirable to brake the core-shaft when the drive connections therebetween and the shaft 13 are disengaged. For this purpose, a brake-band 44 (Fig. 11) encompasses the clutch member 40. The ends of this band are connected by links 45 and 46, at 47 and 48, on the opposite sides of the pivot-point 49, to a bell-crank lever 50. The pivot 49 supports this lever at the side of the pedestal 10. A weight 51 is adjustably carried by this lever to vary the tension of the band.

Secured to the pedestal 10, in alinement with the brake-lever 50, is a bracket-member 52 in which is supported a solenoid 53. The core of this solenoid carries a shaft 54 having an attachment at 54′ to the lever 50. When the solenoid 53 is energized, the shaft-core 54 is projected therefrom and raises the counter-balance 51 so that the brake-band 44 is slackened from its normal contact with the clutch member 40. A contractile coil-spring 44′ (Fig. 11) has one end secured to an intermediate portion of the brake-band 44 and functions to lift the slackened bank from contact with the revolving clutch member 40, and, thus, prevents undue and premature wear of the band. When the operator presses a suitably connected stop-button (hereinafter to be described which deenergizes both the solenoid-clutch 14 and the solenoid brake-control 53, all drive of the shaft 5 ceases, while at the same time the brake counter balance 51, being no longer upheld by the core 54 of the solenoid-controller, is allowed to move the lever 50 in such manner as to tighten the band 44 about the clutch member 40 to brake the shaft 5.

Figure 13:
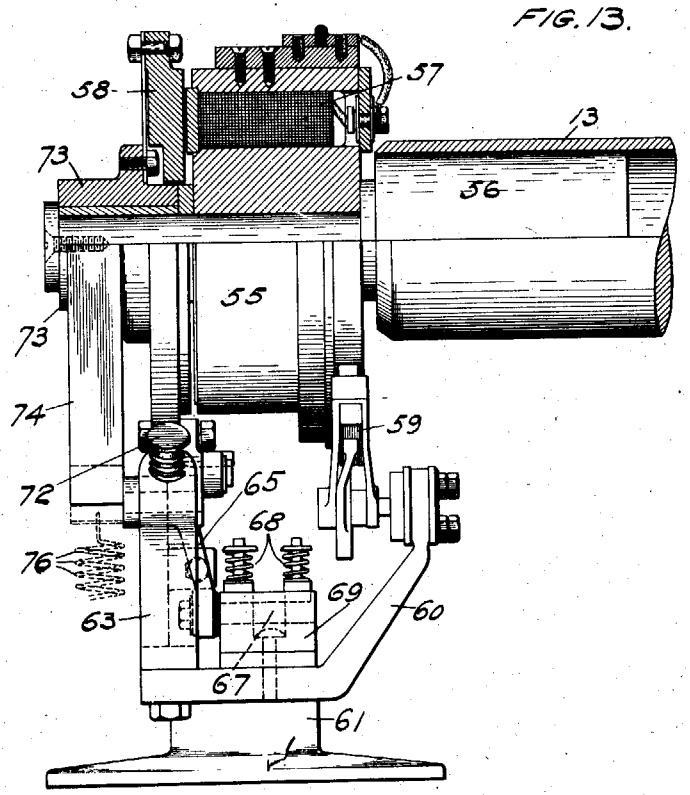
Fig. 13 is a view in side elevation of the same device, parts being shown in section.
Figure 12:
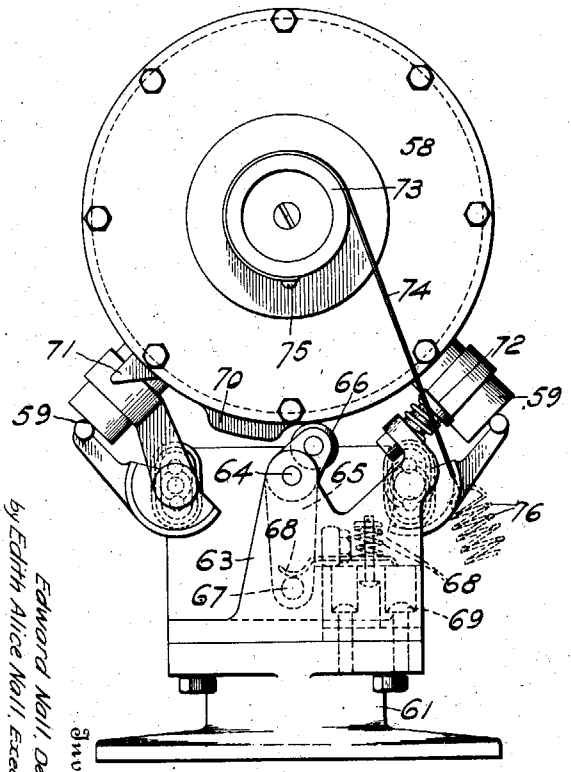
Fig. 12 is a view in rear elevation of the timing device which controls the placing of a fabric-ply upon the tire-core or partially built carcass.

In our preferred embodiment, it is advantageous to arrange for an initial single rotation of the core shaft 5 at slow speed. In Figs. 12 and 13 we have disclosed a structure for this purpose. It comprises a solenoid drum 55 mounted upon the rear extremity of the shaft 13 which is hollowed out for this purpose. A plug-member 56 telescopically enters the open extremity of the drive-shaft and axially centers the drum 55 thereon. This drum is provided with an annular core 57 which is energizable to attract thereto a clutch member 58 loosely mounted on the plug-member 56. The solenoid drum 55 is equipped with brush devices 59 supported upon an arm 60 carried by a base 61 of a bracket 62 (Fig. 8). The base 61 is provided with a rear wall 63 to which is pivoted, at 64, a bell-crank lever 65. One extremity of this lever carries a roller 66 in contact with the outer periphery of the clutch-member 58. The opposite extremity of the lever 65 is provided with an arm 67 which is engaged by a pair of resilient metallic contacts 68, the latter being resiliently supported upon a small pedestal 69 secured to the base 61. The lever 65 is a conductor of electricity and forms a part of the circuit in which the solenoid 57 is placed. A displacement of the lever 65 from the position illustrated in Fig. 12 to one in which no contact is provided between the arm 67 and the contacts 68 breaks the solenoid circuit and deenergizes the core-member 57. A lug 70 projects from the periphery of the clutch-member 58 to break the solenoid circuit. A stop member 71 is also projected from the periphery of this clutch-member, immediately in the rear of the lug 70, to engage with a shock-absorbing plug 72 on the rear pedestal wall 63, to cushion the recoil or sudden return of the plate 58 to its normal position. A cylindrical reel member 73 is provided in conjunction with the clutch member 58 and has trained thereover a flexible return-element 74, one extremity of which is made fast, as at 75, to the reel 73. The free extremity of this belt is connected to a coil-spring 76, the latter being of such strength as to unwind the belt from the reel 73 when the clutch-solenoid is deenergized and, in so doing, it will return the clutch member to normal position.

Figure 14:
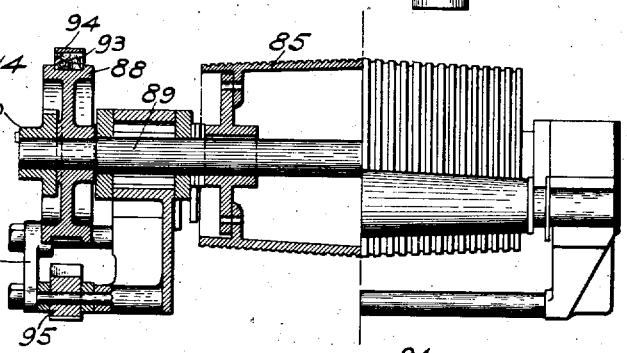
Fig. 14 is a view, partially in longitudinal section, of one of the stock-rolls with its accompanying tension-mechanism.

*3. Stock rack structure.*—The stock-rack consists of a structure disposed with respect to the tire-core 2 and comprises a pair of side frames 78 (Fig. 6) mounted upon a base 79 and cross-connected by rods or bars 80 to form a substantial supporting structure for the swinging bracket 81. This bracket includes a pair of arms 82 and 83, each of which has connected to it a projecting bearing-member 84 in which is journaled a crowned or double-conical roll 85. The latter is provided with peripheral ridges (Fig. 14) which are slightly helical and which incline away from the largest diameter of the roll (at the center of its length) toward each end in order that the fabric passing over this coned roller may be stretched and spread transversely from its center toward both edges.

Figure 15:
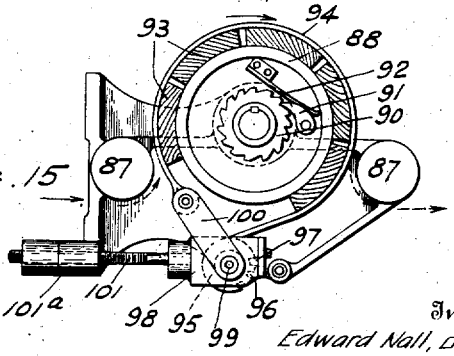
Fig. 15 is a view in end elevation of the stock-roll tension-mechanism.

The swinging bracket 81 is pivoted, by a pintle-bar 86, to the supporting-frame and is of such configuration that each of the rolls 85 is approximately equidistant from the pintle-axis 86, thus providing uniformity in the delivery of fabric from either of the spreader rolls. Each of these spreader rolls has associated with it a pair of double-coned plane-surfaced guide-rollers 87 (Fig. 15) which determine the course and travel of the fabric over the main spreader rolls 85.

Each spreader roll is adapted to be tensioned to regulate in an accurate manner the tension of the fabric plies delivered to the tire-core. For this purpose, a peripherally grooved wheel 88 is loosely mounted on the extremity of the shaft 89 which supports the rolls 85. A ratchet-disk 90 is keyed on this shaft and connects the wheel 88 with the shaft through the cooperation of a pawl-member 91 pivotally carried by the tension wheel 88 and which is held in engagement with the ratchet by a spring 92. The feed direction of the roll 85 is indicated by arrows in Fig. 15. This roll may be reversely rotated, however, as is sometimes necessary in rewinding a surplus of fabric taken off, without incurring the drag of the tension mechanism. This includes a friction-belt 94 comprising a plurality of cork, leather or similar inserts 93, and is in contact with the peripheral groove of the tension-wheel. One extremity of the belt 94 is connected to an adjusting wheel 95. The latter is provided with a plurality of gear-teeth 96 with which engages a stop tooth 97. This tooth projects inwardly into the interior of a hollow member 98, in the walls of which the adjusting wheel 95 is laterally journaled. A shaft 99 supports the wheel within its member 98, and there is connected to the projecting end of this shaft a link-member 100 whose other end serves to anchor the opposite end of the belt 94. A shaft 101 is secured to the hollow member 98 and supports at its outward extremity a counterbalance 101[a]. It will be seen that the action of this tension mechanism is substantially similar to that of the brake mechanism described in connection with the shaft 5. The counterbalance tends to tighten the band with the friction-inserts upon the grooved periphery of the tension wheel and affords a steady and predetermined resistance to rotation of the stock-roll 85 in the direction of fabric delivery. The take-up wheel 95 is provided for use when the friction-inserts 93 become worn.

Figure 6:
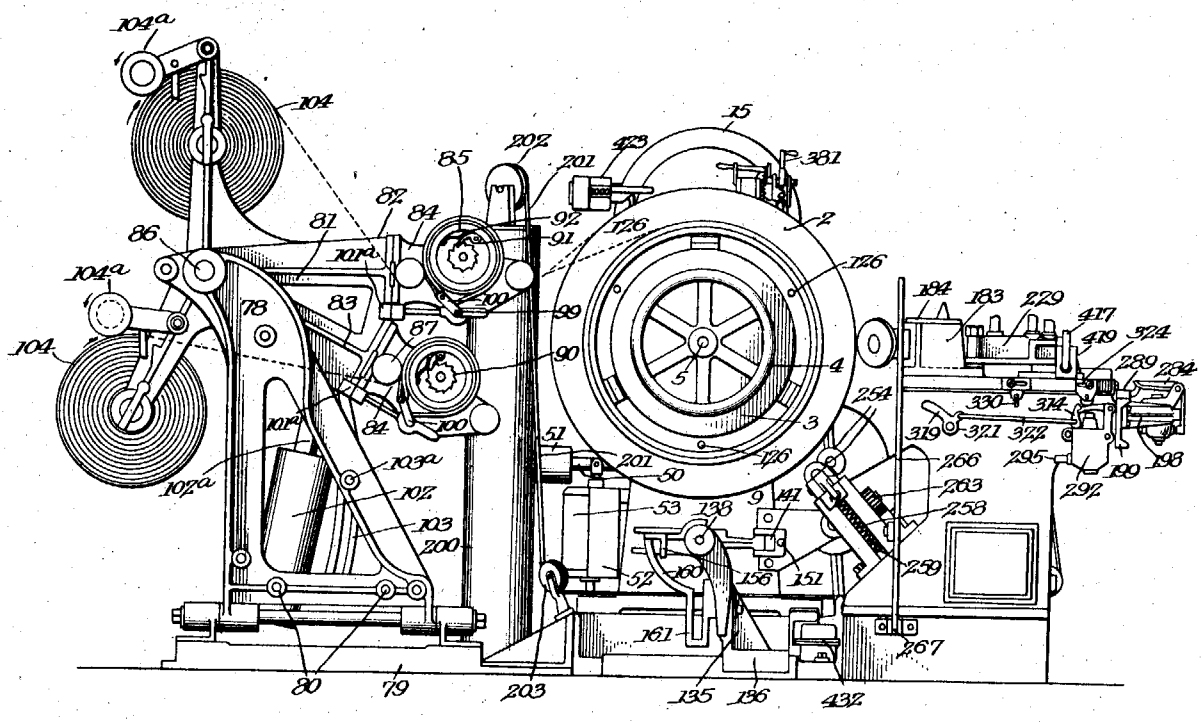
Fig. 6 is a view in front elevation of the assembled machine.

The pair of stocks rolls on the swinging bracket 81 provide for the incorporation of fabric piles of different widths into the tire-carcass. Each of the stock rolls is properly positionable with respect to the tire-core preferably by pressure-operated control-mechanism consisting of a cylinder 102 and its contained piston 102[a] (Fig. 6). The latter is connected at any suitable point to the underside of the swinging bracket, and is movable upwardly when a suitable pressure-fluid, such as air, is admitted into the cylinder in order to elevate the lower roll of the swinging stock-bracket to the proper height to permit the operator readily to withdraw a ply-length of fabric from this lower roll. When the air is exhausted from beneath the piston 102[a], the latter returns to the bottom of the cylinder 102, due to the weight of the bracket, thus bringing the upper stock-roll into the correct fabric-delivering position, as shown in Fig. 6. To limit the downward movement of the swinging bracket when air is exhausted from the cylinder, and to limit, also, the upward movement of this bracket in both directions, there is provided a pair of slotted arcuate arms 103 depending from the bracket, through the alined slots of which extends a fixed bar 103[a] secured between the side frames 78 of the stock-rack structure. A pair of stock-bearing rolls 104 are mounted upon outstanding extensions of the swinging bracket 81, upon which is pivoted a liner roll 104[a] upon which the material employed to line the successive convolutions of a roll of the impregnated tire-fabric is taken off as a ply of the fabric is delivered to the respective stock-rolls 85.

*4. Bead positioning mechanism.*—Preferably and as shown, mechanism for positioning endless annular beads or bead-cores on opposite sides of the tire-carcass is herein provided: This mechanism includes a pair of setting-rings adapted to support the beads in substantially the position they are to occupy upon the tire, both of these rings being forced against the carcass from opposite sides in such manner as to impress the beads firmly in position thereon. One of the bead-setting rings is moved into position mechanically, while the second ring is manually positioned. Both rings are then forcibly clenched together, with a portion of the tire-carcass between them, by means which will be explained.

Figure 20:
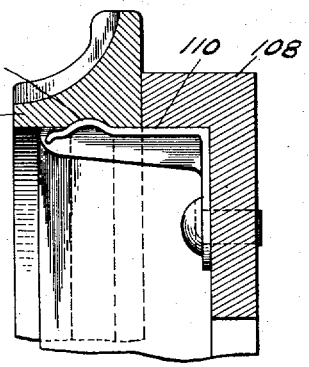
Fig. 20 is a detail view in cross-section of this same ring.

In Fig. 16, a machine-positioned bead-applying ring 105 is shown, while Fig. 8 illustrates the mounting thereof. This ring consists of an annular member 106 arranged for sliding movement upon the elongated bearing 6. The ring is formed with a flange 107 to which there is fastened a ring-bearing-flange 108. This latter is cut away to receive the bead-ring proper 109. This ring is provided with a grooved edge intersected at spaced intervals by ribs which form a seat for the beads. It is also provided with an internal annular groove 109[a] (Fig. 20) whereby the ring may be loosely mounted on its flange 108 through the medium of resilient means 110. The annular member 106 of the bead-applying ring is provided with a key-way splining the ring upon the shaft-bearing 6 by an upstanding rib 111 thereon.

Pressure-operated means for controlling the movement of the ring upon the splined rib 111 consists of a cylinder 112 having opposite inlet connections 113 (Fig. 8) in order that pressure-fluid may enter the cylinder to drive the piston thereof (not shown) in either direction of its travel. This piston is provided with a piston-rod 114 extending through a stuffing-gland 115 to a point of connection with the supporting-flange 107 of the bead-positioning ring. Admission of the pressure-fluid at the rear of the controlling cylinder 112 (at the right of Figs. 3 and 8) will force the piston forward and move the bead-applying ring into juxtaposition to the tire-carcass supporting the tire-core. Admission of the pressure-fluid into the forward end of the cylinder will then serve to retract the bead-ring 109 from its position of proximity to the tire-core in order not to interfere with the tire-building functions of other parts of the machine. An operator's valve for controlling the admission of the pressure-fluid into the bead-ring control-cylinder 112 is provided and this will be described more in detail presently.

Figure 18:
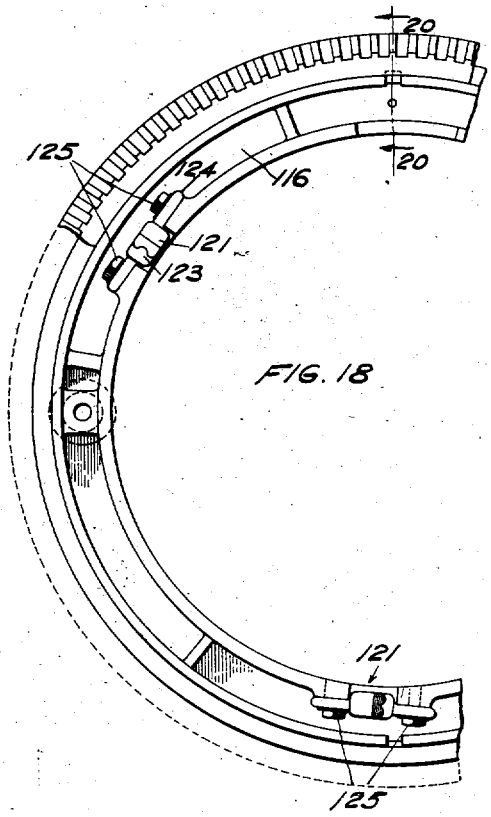
Fig. 18 is a fragmentary view in plan of the manually-positioned bead-setter-ring.
Figure 19:
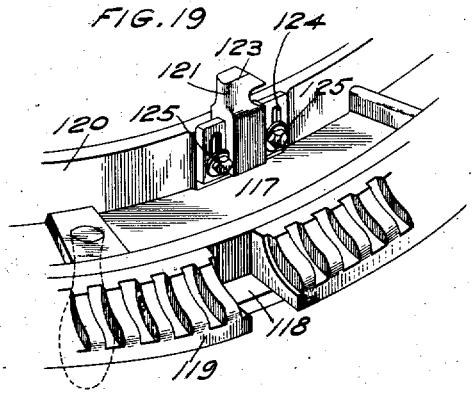
Fig. 19 is a fragmentary detail view in perspective of a portion of this ring.

A manually-positionable bead-ring 116 includes an annular base-member 117 (Figs. 1, 18 and 19) whose inner peripheral edge is channeled, at 118, to accommodate a bead-supporting ring 119 which is similar to the bead-ring 109. The member 117 is provided with a circular wall 120 to which is secured a plurality of grip-arms 121 (Fig. 17). These arms include a shank-portion 122 terminating in an angulated extremity 123, the edge of which is arcuated to conform to the shank of a bolt-head with which the grip-arm may be engaged. Laterally-extending plates 124 are secured to the shank 122 and are slotted for the adjustable accommodation of bolts 125 (or a similar fastening means) whereby the grip-arms may be supported upon the ring-wall 120.

The grip-arms 121 serve to attach the manually-positionable bead-ring 116 to the bead applying-ring 105. Headed bolts 126 (Fig. 16) project from the latter at points corresponding to those on which the grip-arms 121 of the manually-positionable bead-ring are situated. Each of these headed bolts 126 is carried on the axis of a piston 127 operable within a fluid-operated cylinder 128 (Fig. 16) and normally positioned within such cylinder by an expansible coil-spring 129 therein in such manner as to maintain the headed piston-bolts 126 at their limit of projection therefrom. A channel 130 is provided in the interior of the flange 107 and serves to connect all of the pneumatic cylinders 128 in series through the medium of separate by-passes 131. The admission of the pressure-fluid through the main channel and the auxiliary by-passes to all of the cylinders 128 serves to retract the bolts into the cylinder simultaneously and to draw the ring 116 toward the main ring 105. When the latter has first been positioned in proximity to the tire-core and the second ring is engaged with the opposite side thereof (with the grip-arms extending through a central space of the core and into contact with the corresponding piston-bolts), admission of the pressure-fluid into the cylinders 128 will serve to clinch the two bead-rings at once upon opposite sides of the tire-core and thereby accurately position the beads.

5. *Trimmer mechanism.*—Since the plies of tire-fabric which are successively superposed upon the tire-core 2 are slightly wider than is actually required by the over-all, bead-to-bead measurement of the finished carcass, there usually is surplusage of fabric along the toes of the tire after the beads and the outermost plies have been put in place. It is accordingly desirable to provide mechanism for trimming this surplus fabric uniformly and quickly: Preferably and as shown, this mechanism includes an upright frame-plate 135 (Figs. 21 and 22) provided with an attaching base 136 for securing it to the main machine structure. The frame-plate 135 supports a pair of arms 137 which are bored in axial alinement for the reception of headed trunnions 138. These trunnions pivotally support between them an oscillatable plate-member 139 which pivotally carries a pair of arcuate trimmer-arms 140. Each of these arms terminates in a head 141 over which is adjustably fastened a knife-supporting saddle 142. Each saddle includes a pair of side-plates 143 pivotally secured to the head 141 of their trimmer-arm by bolts 144. The side-plates of the saddle are also provided with arcuate slots 145 for the reception of bolts 146, whereby the saddle may be maintained in any adjusted position upon its pivot bolt 144. Formed integrally with the side-plates 143 of each saddle is a clamp-member 147 with which there mates a complemental clamp member 148 for a knife blade 149. Fasteners 150 removably secure the clamp-members upon the knife, while a thumb-screw 151 extends between the clamp-members to form a means for adjusting the knife forwardly as the edge of the blade becomes worn. Each of the trimmer-support arms 140 is provided with an arm-extension 152 depending below the pivotal point of a support 153 to which the trimmer arms are secured to the oscillatable member 139. The arm-extensions are connected by link members 154 to a connecting-bar 155 having its lower end fastened to a foot-lever 156 pivoted at 157 upon an oscillatable plate-member 139. Depression of this lever draws the connecting-bar 155 downwardly and forces the two trimmer link-members 154 outwardly and to the same distance, thus driving the trimming edges of the opposite knife blades 149 simultaneously into corresponding contact with the tire-core 2 along the lines of the beads. A contractile coil-spring 158 tends to throw both lever and connecting bar upwardly, thus moving each trimmer-arm 140 outwardly from its previous contact with the core 2 when the lever-depressing force is removed. A guide-rail 159 projects from one side of the support-arm 137 and is formed with an arcuate portion 160 radial with respect to the pivot 138 and of such radius that the foot-pedal 156 is engaged thereby and normally prevented from moving about its pivot-point 157 in the manner described as necessary to bring both trimming knives into contact with the core. The arcuate-portion 160 terminates in an elongated bight-portion 161 to afford the foot-pedal 156 sufficient throw for causing the engagement of both trimming knives with the core 2 when the pedal reaches this point along the guide-rail. The weight of the trimmer-arms 140 and their accompanying saddles 142 is such that the supporting plate-member 139 is normally maintained in the horizontal dotted-line position 162 of Fig. 21, with the arms 140 so separated as to permit them to be moved into a vertical position without striking the outer circumference of the core 2. Movement of the arms into operative position is accomplished by depressing the foot-pedal 156 from its dotted position in Fig. 21 downwardly around the arc of the guide-rail 160 until the mouth of the bight-portion of this guide-rail is reached, at which time the plate-member 139 with its arm will have been moved into a vertical position with a knife on each side of the core 2 and directed at the bead line. A further depression of the foot-lever against the action of the coil-spring 158 causes the simultaneous approach of the trimmer-arms 140 toward the core and the engagement of each knife 149 with the surplus tire-fabric immediately outside of the beads or toes of the carcass. With the trimming-knives in this position, which the operator maintains by keeping his foot on the depressed lever 156, a single revolution of the core 2 results in the complete trimming-off of the surplus fabric. Removal of the operator's foot causes the lever 156 to be moved upwardly by spring 158 until the lever clears the point to which this bight runs into the short-radius portion 160, permitting the top-heaviness of the arms 140 to rotate the supporting-plate 139 downwardly about the pivotal axis provided by the trunnions 138. The arms are thus disengaged from the core while in their vertical position and are returned to normal position in a manner which reduces the necessary manual supervision by the operator to a minimum.

Figure 3:
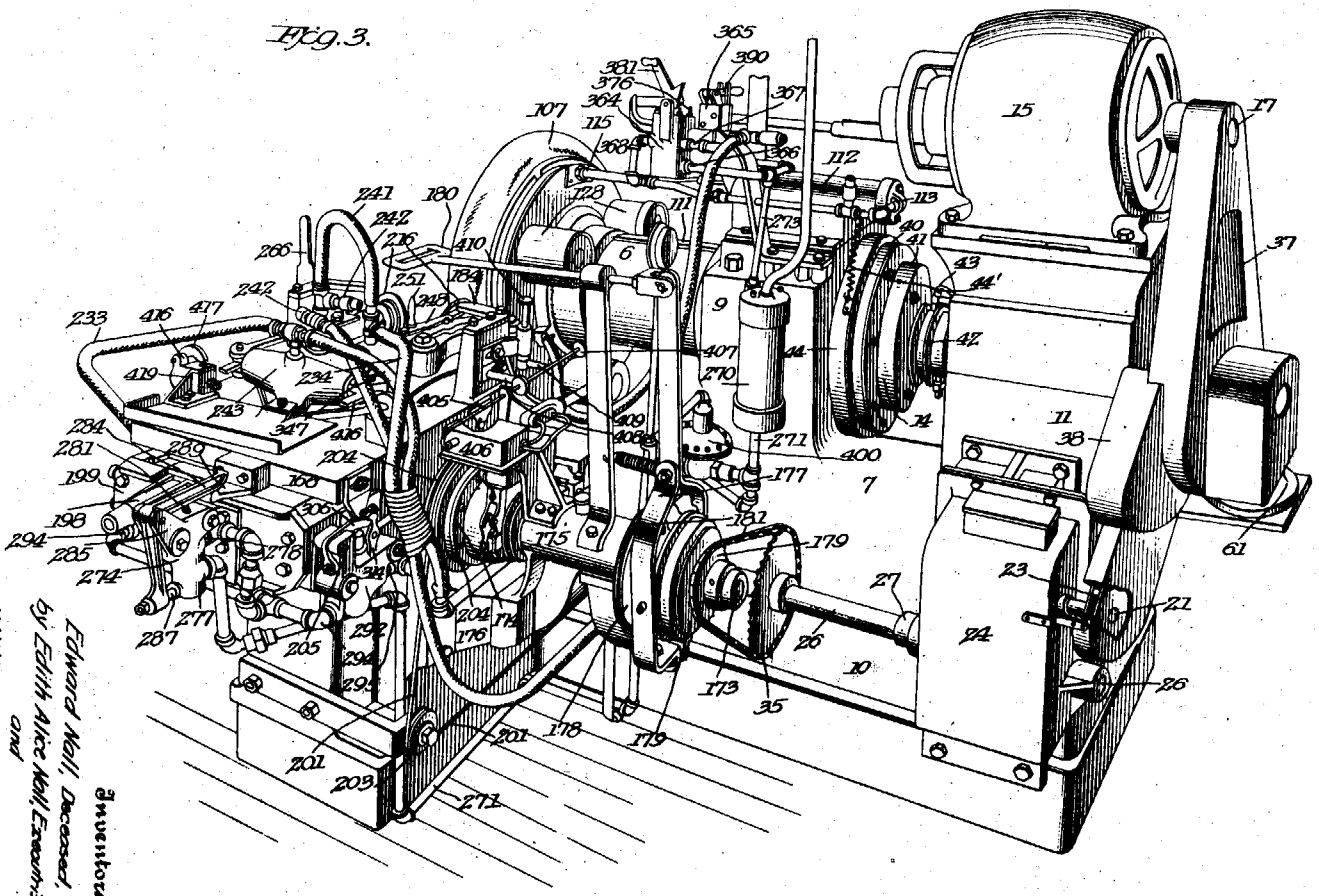
Fig. 3 is a view in isometric perspective—taken from a different angle than Fig. 1.
Figure 7:
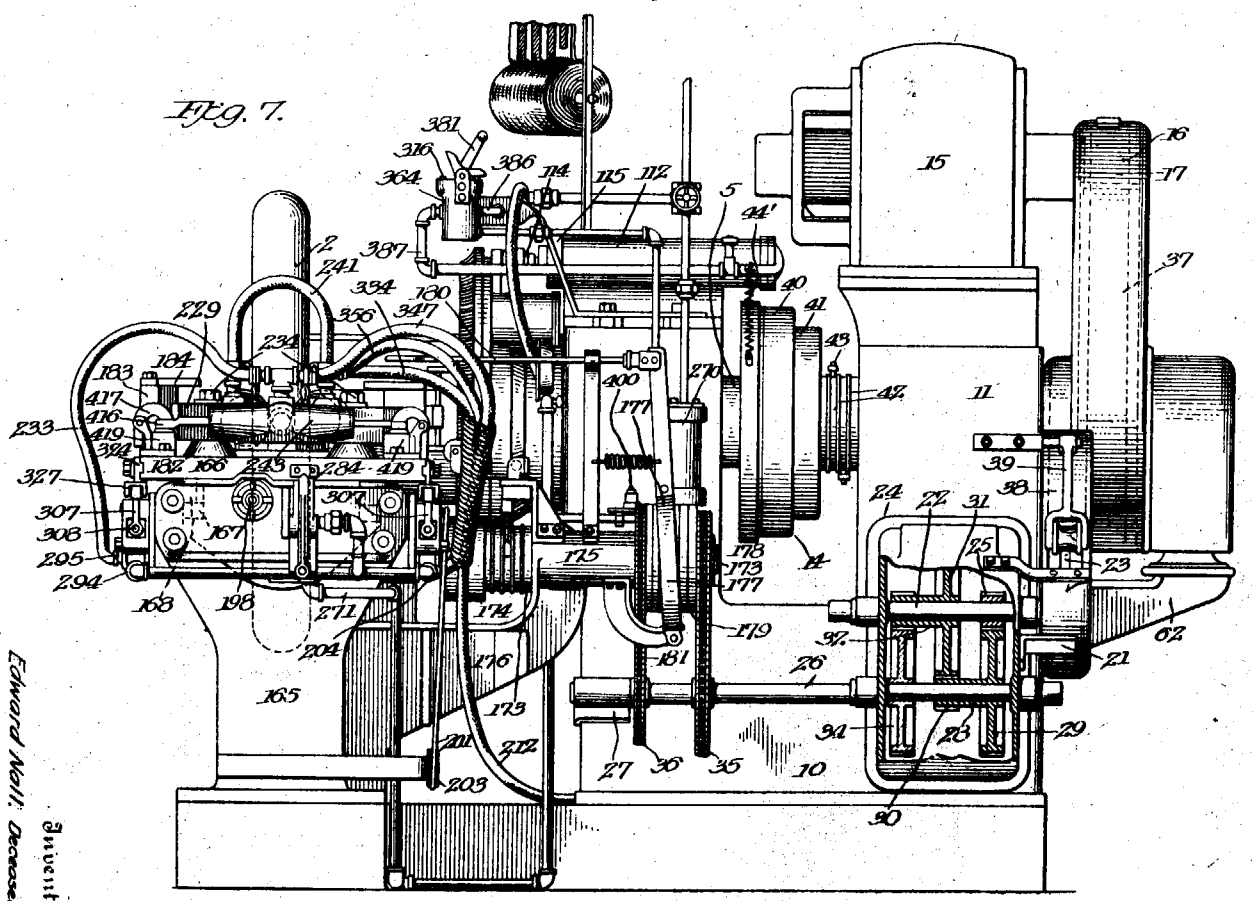
Fig. 7 is a view in side elevation of the machine.

*6. Fabric manipulating mechanism.*—The devices which are to press the tire-fabric about the core are preferably arranged in juxtaposition thereto and include a pedestal 165 and a carriage 166 thereon. The carriage supports the various instrumentalities connected with the fabric-pressing and controlling members: The pedestal 165 is of Y-shaped formation (Fig. 7), the upper extremities of the Y-arms thereof terminating in inturned track-members 167. Engaging with these members are track-plates 168 secured to the under-surface of the carriage and which form means whereby the carriage may travel longitudinally without being displaced. The carriage is essentially a platform, as shown in Figs. 1, 3 and 7, but is provided with a central dependent box structure 169 (Fig. 26) in which is arranged certain controlling gear now to be set forth in detail. It is to be understood that the carriage has advancing and receding movements in respect to the core, and means for effecting such movements are provided, as will presently be explained.

Secured longitudinally of the carriage (Fig. 26), and in the same vertical plane as the circumferential center-line of the tire-core 2, is a rack-bar 170 constituting a part of co-acting means for advancing the carriage toward the core. Meshing with this rack-bar is a drive-pinion 171 mounted upon a shaft 172 extending transversely through the pedestal, the drive-pinion being thus arranged between the two track-arms. This shaft is journaled in the pedestal 165, and is rearwardly continued by an axially-alined shaft-portion 173 (Fig. 7), to which it is connected by a solenoid-clutch 174. The shaft-portion 173 is centrally supported upon an elongated bearing 175 carried on a bracket 176. A double-throw clutch-mechanism 177 governs the drive of the shaft 173, being capable of operatively engaging either of two loose drive sprockets 178 and 179 with the shaft. A handle 180 provides a convenient control for the sprocket-clutch 177. These sprockets are of different sizes to correspond with the different speeds to which the carriage-drive-shaft is to be rotated, and are connected by drive-chains 181 with the sprockets 35 and 36 mounted upon the extremity of the countershaft 26 already described in connection with the main drive mechanism. Upon the carriage (Figs. 25 and 26) there is provided a pair of bosses 182 upon which presser-levers 229 (forming a part of the carriage-equipment) are pivotally mounted. These levers carry fabric-pressing devices or members, as will later be described. The carriage is also provided with sidewalls 183 adjacent to its forward edge to support guide-tracks 184 which define the path of movement of the presser-levers 229 about their pivots. A pair of bosses 185 project upwardly from the carriage-top, adjacent to the pivot-bosses, and provide a passage-way for pins 186 which serve as control stops for their respective levers. These pins are controlled from a common rock-shaft 187 by arms 188 carried at the ends of the shaft, the latter being journaled in bearings 189 transversely below the carriage-top. A third arm 190 projects centrally and rearwardly from the rock-shaft and has connected thereto a contractile coil-spring 191, whose other extremity is secured to the top of the carriage-platform in such a manner as to have a tendency to impart rotation to the shaft in the counter-clockwise direction of Fig. 26. A rotation of the shaft in this direction, if permitted, would withdraw the pins 186 from their projected position. This counter-clockwise rotation of the rock-shaft 187, however, is prevented when the carriage is in its normal, starting position by a wedge-cam 192 carried at the extremity of a shaft-arm 193 slidably arranged in bearing-portions 194 of the carriage-box structure. This cam-member carries a pin 195 which is movable in a slot 196 formed in the bearing-portion which supports the arm of the cam-member. This pin anchors one extremity of a contractile coil-spring 197 whose other end is secured to the rear of the carriage-structure. The arm 193 extends rearwardly through the carriage-structure and is alined with the axis of a recoil-device casing 198. This cylinder is mounted on a stop-plate 199 and serves to limit retraction of the carriage from its position of operation on the tire-core. The projected pins 186 provide stops which regulate the separation of the outer extremities of the presser-levers 229 and determine the position of these levers at the beginning of any fabric-pressing operation. Since, however, certain exigencies of the fabric pressing operation demand that the stops be removed when the carriage has reached a predetermined point in its advance toward the tire-core, the mechanism just described provides automatic means for accomplishing this end.

As the carriage advances toward the core and carries the rock-shaft 187 with it, the cam-arm which initially prevents rotation of the rock-shaft to withdraw the pins is held back against the stop-plate 199 by the contractile spring 197 so that it is gradually withdrawn from engagement with the control-arm 190 of the rock-shaft, permitting the spring 191 to impart through this arm a partial rotation in the counter-clockwise direction of the rock-shaft. This results in a withdrawal of the pins 186 from their projected, lever-limiting position at the proper point in the carriage-advance. Retraction of the carriage again brings the cam-member 192 into play upon the control arm of the rock-shaft again to force the pins 186 into their projected position while the carriage is being brought back against the stop-plate.

Figure 40:
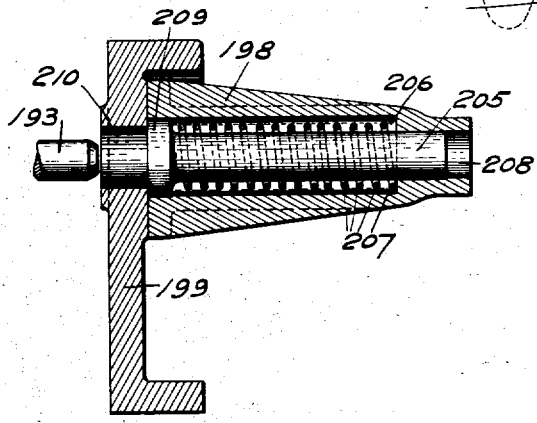
Fig. 40 is a detail view in section of one side of the shock-absorbing mechanism employed for the presser-supporting carriage.

Retraction of the carriage from its position with relation to the tire-core, after the completion of any pressing operation, is accomplished through the medium of a motor, such as a weight which is raised when the carriage advances. The weight is preferably incased within the upstanding cylinder 200 (Figs. 2, 4 and 6) and is supported by a flexible connection 201 passing over a pulley 202 rotatably mounted at the upper mouth of the cylinder. The cylinder is situated at any convenient portion with relation to the various machine structures, and the flexible connection 201 is trained over auxiliary pulleys 203 and then wound upon a reel or drum 204 fixed upon the carriage-drive shaft 172 (Fig. 3). As the carriage advances, the rotation of the drive-shaft winds up the flexible connection upon the drum 204 and, in so doing, raises the weight. At the completion of any pressing operation, the solenoid-clutch 174 is deenergized and the connection is thus thrown out between the axially-alined drive-shaft portions 172 and 173. The shaft-portion 172 is then rotated by an unwinding of the flexible connection from its shaft reel 204 as the weight falls within the cylinder. This rotation of its shaft reel draws back the carriage upon the pedestal through a rotation of the drive-pinion 171 (in engagement with the carriage rack-bar) opposite to the advancing rotation of the same gear. This effects a quick return of the carriage to starting position. In order to absorb the shock of the impact between the rapidly returned carriage and the stop-plate therefor which is carried across the spaced track-arms of the pedestal, the cushioning-means 198 is provided. This includes a plunger member 205 (Fig. 40) slidably journaled within the casing 198. The casing is provided with an interior channel 206 to accommodate a expansible coil-spring 207. This spring is seated against an enlarged annular shoulder 209 formed on the plunger 205 and normally positioned at the inner extremity of the casing-channel. The casing is secured to the stop-wall 199 of the pedestal and has an enlarged extremity 210 therethrough in order to present a resilient thrust-surface in axial alinement with the cam-arm 193. If this cam-arm were not cushioned, it might happen that one of the presser-levers 229 would be positioned over the boss 182 through which the stop pins 186 project, a condition which would cause the destruction of the pins, or of their mounting members, providing the end of the cam-arm were brought solidly against the rear stop-wall 199. By provision of this cushioning-mechanism, however, even this inadvertent holding of the pins from their natural projected position will not strain the parts, as the cam-arm will not be rigidly held but will be permitted to cushion the whole train of mechanism by forcing the plunger 205 backward into the casing 198 against the action of the spring-means 207.

Figure 23:
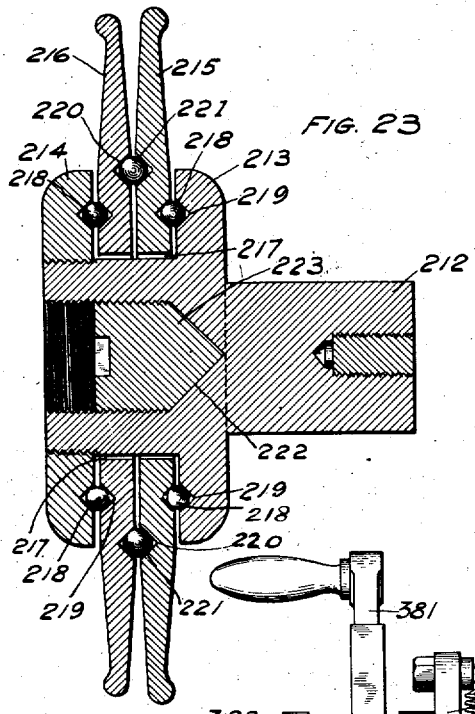
Fig. 23 is a view in cross-section of one form of presser-roll or fabric-manipulating device forming a part of the machine.

Fabric-pressing members (commonly known to the art as stitcher wheels to designate their action upon a loose ply of a tire-carcass) are provided as a part of the machine to lay successive plies of the fabric on the tire-core. These pressing members or stitchers may be in the form of single disks or rolls, as illustrated in Figs. 1, 2, 3 and 6, for instance, or may be of the two-disk type structure shown in Figs. 23 and 25.

This latter, duplex structure is specifically disclosed and claimed in the co-pending application filed in the name of William B. Harsel, February 7, 1917, Serial No. 147,178. This presser-member or stitcher-roll includes a shank or arm 212 provided with a fixed bearing annulus 213 between which and a removable bearing annulus 214 is positioned a pair of separate disks 215 and 216. Each of these disks is provided with a central aperture 217 which loosely encompasses the extremity of the arm 212. The disks are supported within the channel provided by the spaced bearing annuli 213 and 214 through the medium of anti-friction bearings 218 arranged within complemental ball-races 219 formed in the respective facing walls of the disks and their bearings. A similar pair of ball-races 220 provides a channel between the adjacent faces of the disks 215 and 216 themselves, and serves to seat anti-friction bearings 221 which permit the independent rotation of the disks with respect to each other.

The outer extremity of the arm 212 is formed with a conical cavity 222 provided with internal screw-threads for an expanding-member 223 in order that the extremity of the presser-arm may be wedged firmly against the inner circumference of the bearing annulus 214. Slots may be formed in the extremity of the arm 212 in order to facilitate this wedging movement.

Figure 24:
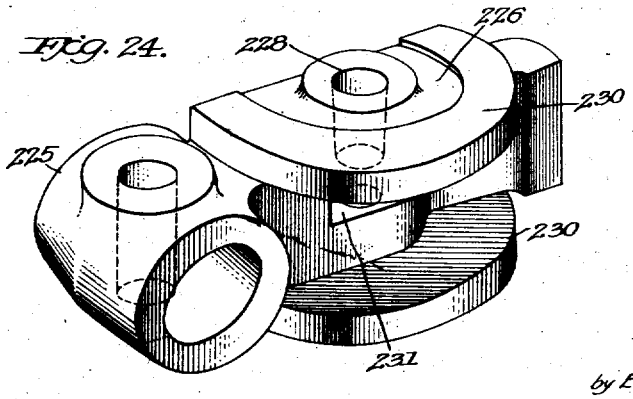
Fig. 24 is a view in perspective of the supporting-arm for the presser-roll.

The shank-portion of the arm 212 for each of the two presser-rolls fits a bearing 225 carried at one end of a presser-arm 226 and is maintained within the bearing-member by a securing-means 227 (Figs. 24 and 25). Each presser-arm 226 is formed with a central trunnion 228 for the pivotal mounting of the arm upon the forward extremity of one of the presser-levers 229. The arm is provided with integral semi-circular bearing-portions 230 to permit the arm to have an oscillatory movement upon the extremity of the lever to which it is pivoted. The arm is centrally apertured, as at 231, to accommodate the bight-portion of a resilient member 232 about the pivot 228. This resilient member is in the form of an expansible spring having a pair of arms extending from the central mounting coil thereof. These spring-arms have a tendency to separate from each other, one of them contacting with a wall 233 formed upon the presser-lever and the other being engaged with the presser-arm itself. Each lever 229 is pivoted at 234 to the carriage-top 166 upon a boss 182, and includes an integral piston-chamber 235 formed with a lateral lug 236.

In each of the lever-cylinders 235 is a piston 237 connected by a link-rod 238 with a yoke-member 239. This latter engages the pivot 227 of the bearing-member in which the arm of the presser-roll is mounted. Each cylinder 235 is provided with an air-inlet 240, these inlets being connected by flexible piping 241 (Fig. 3) for simultaneous and similar operation of the pistons of both presser-levers. Upon this air-line connection is provided a leak-valve 242 to permit exhaustion of the compressed fluid in each cylinder. Located between the two levers 229 (which are arranged for opposite movement as regards each other) is a T-shaped cylinder casting 243 which includes a two-way pneumatic cylinder 244 and a single way pneumatic cylinder 245. The cylinder 245 is arranged at right angles to the two-way cylinder 244 centrally thereof. The cylinder 245 is provided with a piston-member 246 adapted to engage simultaneously with the lugs 236 which extend from opposite presser-levers into normal contact therewith. The pistons 247, mounted within the two-way cylinders 244, provide means whereby the opposite arm-members 226 may be moved toward each other in readiness for the tire-pressing operation, while the single piston (operating upon the similar later projections or lugs 236) provides means whereby these arm-members may be separated in readiness for retraction of the presser-supporting carriage after completion of the pressing operation. The cylinder 245 is is provided with a leak exhaust-valve (not shown but which may be of any automatic construction) while the two-way cylinder 244 is provided with outlet-connections. Means for latching the levers are provided automatically to engage the presser-arms to maintain them in a locked and inoperative position during certain stages of operation of the presser-rolls, as hereinafter explained. This latching means includes a pair of levers 248 preferably pivoted, as to the top of the presser-cylinders (Figs. 3 and 25). These latch levers are provided with keeper extremities 249 which engage lugs 250 formed as a continuation of the pivot-pin that connects the yokes 239 with the piston-links 238. Each lever is provided with a handle 251, and the pair of latches is so grouped that an operator may grasp and release them simultaneously prior to the admission of air into the cylinders. Spring means (not shown but which may be of any desirable character) may co-act with the latch-levers to insure a locking engagement of each latch with its appropriate pin.

Preliminary to action on the fabric-covered core by the presser-rolls, it is advantageous to roll the tread-portion thereof, and this is accomplished by mechanism carried by the pedestal and which comprises, generally, a pair of tapered concave rolls 254 (Fig. 2), the narrowed extremities of which overlap each other so that contact of the rolls, as a pair, with the surface of the tire-ply will cause the rolls to assume a position in which their combined curvature corresponds approximately with that of the core.

Each of these rolls 254 is mounted for oscillation between a pair of ears 255 formed at the upper extremity of a slidable rack-bar 256. A stem 257 extends laterally of the roll and has connected to it a contractile coil-spring 258. The spring is anchored, as indicated at 259, to a portion of a casing 260, in which the opposite rack-bars 256 are similarly mounted for sliding movement. The springs 258 insure each roll a resilient or yieldable contact with the tire-core when the rack-bars have been projected from their casing 260 for this purpose. The means for projecting the rack-bars includes a gear 261 for each rack, one of which appears in Fig. 2. The gears 261 have separate meshing relation with the corresponding rack-bars 256 and intermesh with each other. One of the gears 261 is mounted upon a shaft 262 which projects through the casing 260 to support a control-pinion 263. This latter is secured to the shaft 262 and meshes with an actuating rack-bar 264 slidable in a lateral channel 265 formed as a part of the casing 260. A handle-bar 266 is pivoted, as at 267, and has pivoted to it, at 268, the control rack-bar 264.

The tread-rolls 254 are employed to roll the center, or tread portion, of a carcass-ply onto the tire-core in order to treat the medial portion of this ply before subsequent action of the presser-disks 215 and 216 and so that these latter will not distort the otherwise loose portions of the ply. The operator grasps the lever 266 and pulls it toward him to its limit of movement. This will cause a rotation of the pair of gears 261 and a consequent movement of the rack-bars and their rolls 254 until the latter are projected sufficiently for contact with the core. As the rolls are projected outwardly from the gear-casing 260, the resilient action of the springs 258 is increased until it amounts to a considerable force for holding the grouped rolls 254 in their proper relation to the ply which they must smooth.

Figure 2:
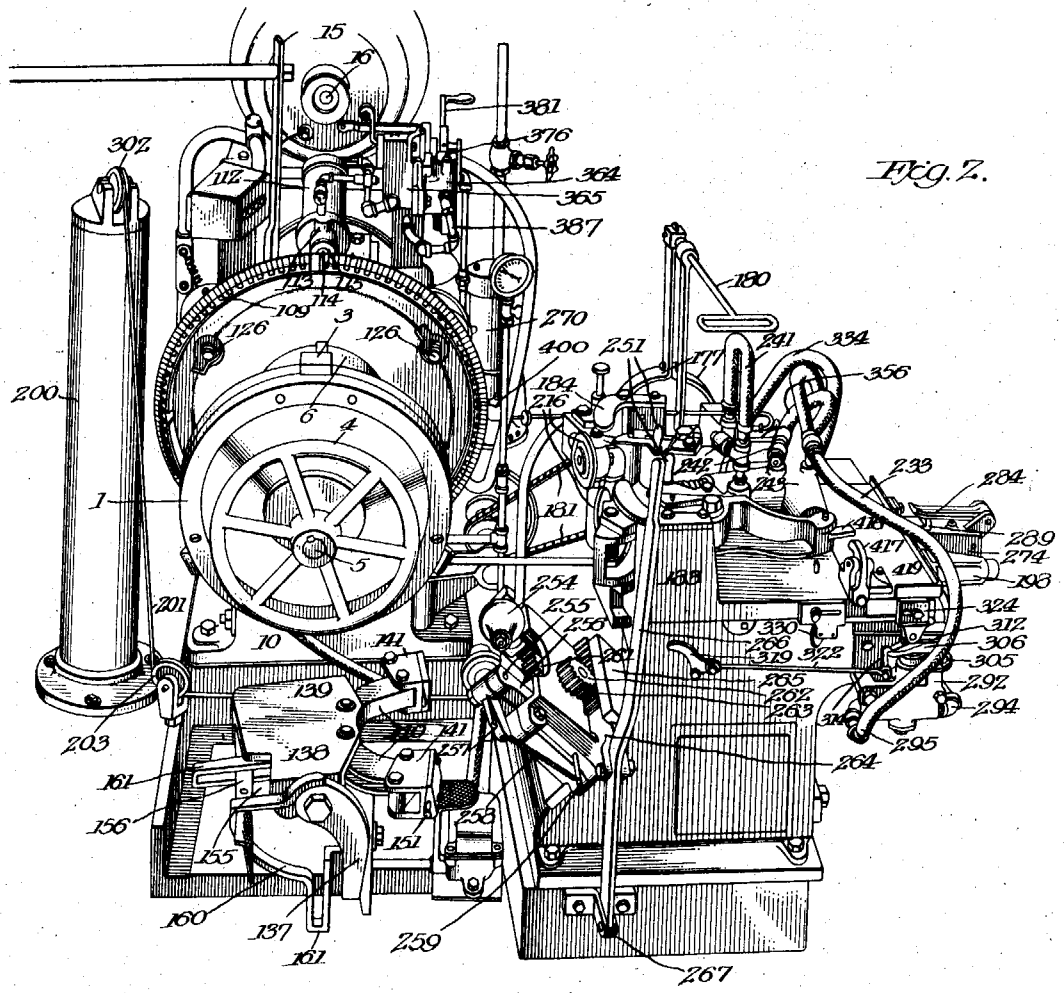
Fig. 2 is a view in direct front perspective of a portion of the machine, showing the tire-building core-support and the fabric-pressing mechanism arranged in conjunction therewith.
Figure 29:
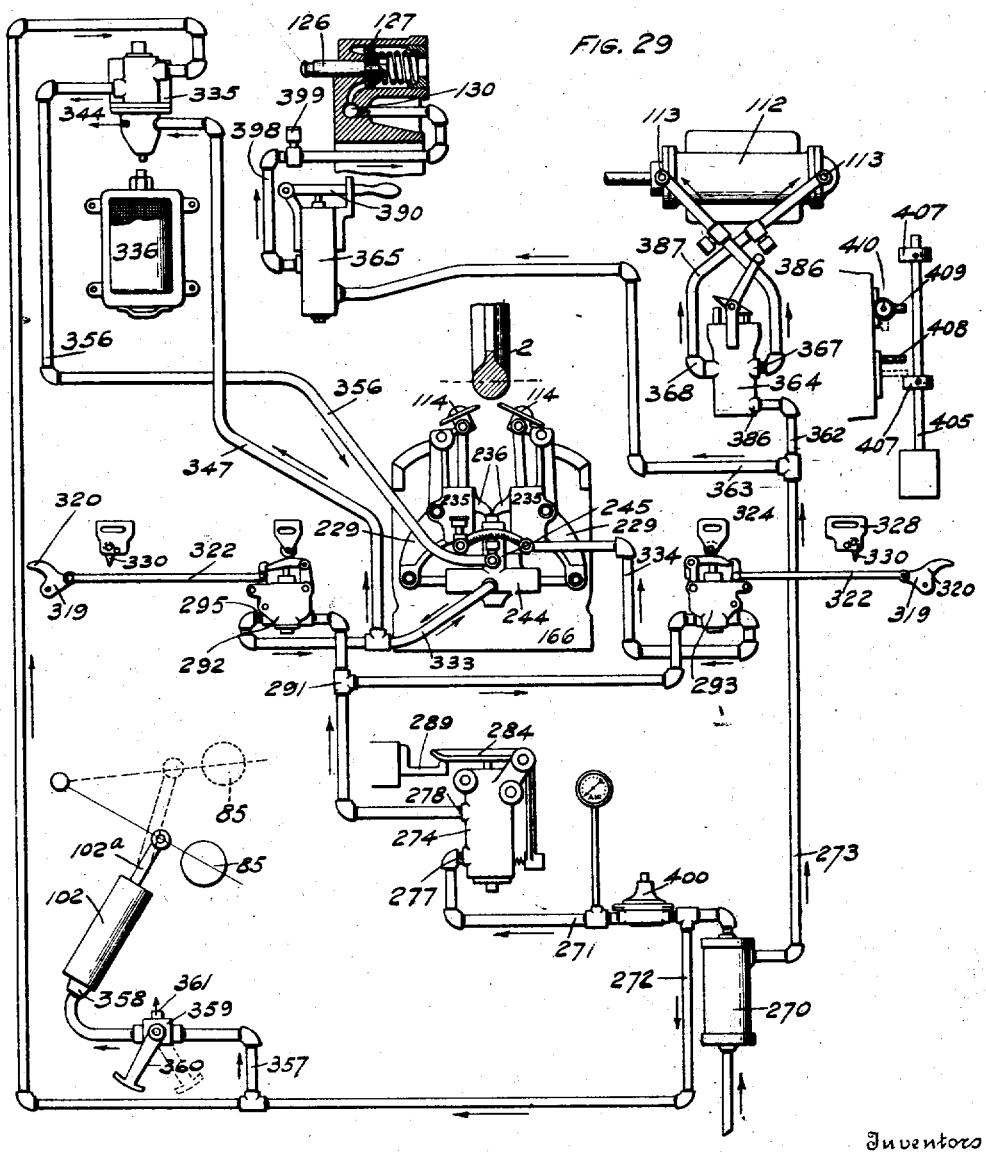
Fig. 29 is a diagrammatic view of the pneumatic control system.
Figure 30:
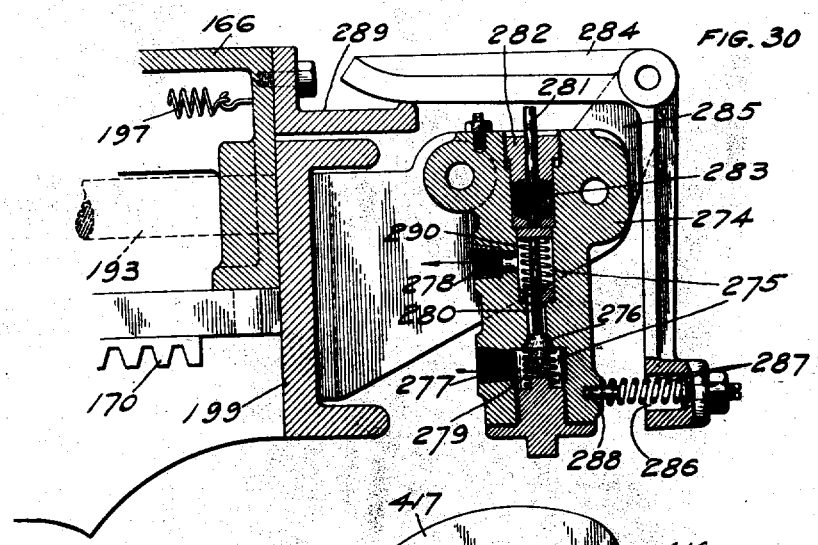
Fig. 30 is a detail view in section of the general cut-off valve employed as a part of the pneumatic, control system.
Figure 31:
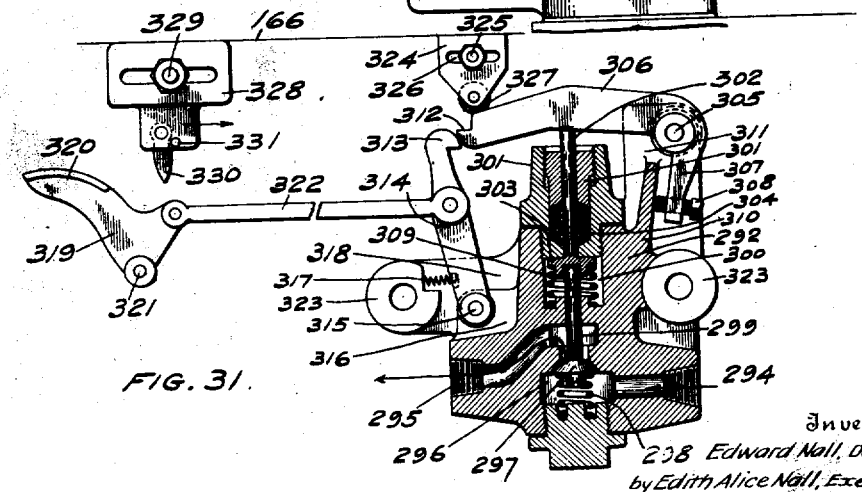
Fig. 31 is a similar view of one of the auxiliary shut-off valves employed in connection with the pneumatic control-system.

7. *Pressure-fluid system.*—The pressure-fluid operated mechanism for actuating the several devices of the machine is governed by a system of controlling instrumentalities, and these will now be described: Pressure-fluid first is conducted from any suitable source (not shown) to a filter 270 (Fig. 29). From the filter extend three lines 271, 272 and 273 for connection to various portions of the pressure-operated structure, it being understood that the pressure-fluid is flowing constantly through the filter 270 and also into the three subsidiary lines just mentioned. The first of these lines leads to a cut-out valve 274 (Fig. 30), which includes a valve-chamber 275 formed with a seat for a valve or closure-member 276. An inlet 277 and an outlet 278 connect with the valve-chamber on opposite sides of the closure-member, the latter being normally seated by the action of an expansible coil-spring 279 and also by the pressure of the fluid in the line 271 which acts upon the valve to hold it seated and to close the outlet 278 from the air-inlet. A stem 280 is provided for this valve 276 and extends upwardly through the valve-chamber and immediately into the path of a plunger 281. This plunger projects through a cap 282 (provided with a suitable stuffing-box 283) to close the valve-chamber, being thus arranged for the action thereon of an exterior bell-crank lever 284. The latter is pivoted by ears 285 upon the valve-casing and has one arm disposed horizontally over the stem of the plunger 281. The other arm of the bell-crank 284 is provided with a recess 286 in which fits one extremity of an expansible coil-spring 287, its extremity being maintained upon the valve-casing by a pin 288. The normal tendency of this spring is to force the bell-crank-lever through a partial rotation in the counter-clockwise direction of Fig. 30 in such manner that the plunger 281 will be forced downwardly into the valve-chamber 275 with consequent unseating of the valve-member 276 and an immediate connection of the inlet 277 with the outlet 278. The means for governing such normal operation of the lever 284 by its spring 287 consists of a valve-closing shoe or plate 289 supported on the carriage 166 to interpose between the operative end of the lever and the plunger-stem 281, the cut-off valve 274 being supported upon the carriage-stop-plate 199, as shown. An expansible coil-spring 290 supports the plunger-member 281 in position normally out of all contact with the stem 280 of the valve-member 276. From the outlet 278 in the cut-off valve-casing the air-line extends to a T-joint 291 where it divides in order to feed simultaneously two cut-off valves 292 and 293 which are positioned upon the side of the carriage, as shown in Figs. 1, 2 and 3. Each of these cut-off valves is similarly constructed so that it will suffice to describe only the valve 292, although they function for different purposes. Each of these valves is constructed internally (Fig. 31) substantially similar to the main cut-off valve 274 and is provided with an inlet 294 and an outlet 295 connected by a valve-passage 296 normally closed by a valve-member 297 held upon its seat by an expansible coil-spring 298 and by the inflowing air-force. The valve-member 297 is provided with an upwardly-projecting stem 299 which crosses the outlet-passage and enters a recess 300 formed in the upper portion of the valve-casing. This recess is closed at the top by a cap 301 through which slidably operates a rod 302 of a plunger 303, a stuffing-gland 304 serving to prevent leakage of the pressure-fluid along the bore of the cap which accommodates the plunger-rod. A bell-crank lever, pivoted exteriorly of the valve-casing at 305, is provided with an arm 306 disposed over the extremity of the plunger-rod so that depression of the lever-arm will depress the plunger 303 and at once unseat the valve 297 against the combined resistance of the valve-supporting spring 298 and the air-cushion at the valve-casing inlet. Another arm 307 of the bell-crank is provided with a set-screw 308 to limit the throw of the valve when the spring 309 is freely permitted to raise the plunger and similarly to raise the actuating extremity of the bell-crank lever which rests thereon. This limiting set-screw 308 engages a wall 310 formed as an integral part of the valve-casing and extends as a web between a pair of ears 311 which serve pivotally to support the bell-crank. The extremity of the arm 306 of the bell-crank lever is provided with a locking notch 312 with which is adapted to engage the locking-notch 313 of a keeper 314, the latter being pivoted, as at 315, between a pair of ears 316 extending from the valve-casing immediately over the outlet 295. An expansible spring 317 is supported by an arm-structure 318 surrounding the mounting ears for the keeper 314 and engages the keeper above its pivot in order to exert a resilient force in the clockwise direction of Fig. 31, thus insuring the locking down of the actuating-arm of the bell-crank lever when the latter has been sufficiently depressed to open the valve-member 297 to its limit. This arrangement normally locks the valve in open position after the bell-crank lever has been properly actuated. A valve-controlling cam-member 319 is provided with a curved actuating-arm 320 and is pivoted at 321 to the side of the pedestal 165. This cam-member is connected by a link 322 with the keeper 314 and provides a trip-mechanism for temporarily disconnecting the keeper and its latch 312. Bosses or enlargements 323 are provided on the valve-casing for its attachment to the pedestal 165 immediately below the carriage 166. Actuating means for both the cam 319 and the bell-crank arm 306 depend from the presser-supporting carriage in order that movement of the latter with relation to the pedestal may automatically control the actuation of the valve-member 297. For engagement with the bell-crank arm there is provided a plate 324 adjustably mounted on the carriage by a fastening means 325 which operates through a slot 326 and supports a roller 327 adapted to engage with the upper surface of the bell-crank arm. This arm is formed with a sloping surface to secure a properly graduated throw. A similarly slotted tri-member 328 is also secured to the carriage by a bolt 329 and carries a freely-swinging arm or cam-operating member 330 which has a path of movement to bring it into contact with the cam-arm 319 of the valve-latch control when the carriage 166 travels in relation to the core. A pin 331 is supported by the member 328 to one side of the swinging arm 330 in order that the latter may be rigid with the member 328 to operate the cam 319 when the carriage moves forwardly. The receding movement of the carriage causes the cam-arm 330 to ride over the cam without actuating it. These operating members for the valves 292 and 293 are similar in each instance and form a properly timed and automatic control of the pressure fluid lines upon which these respective subsidiary cut-off valves are interposed.

From the outlet 295 of the valve-casing 292 extends a pressure fluid pipe-line or conductor 333 to the center of the two-way cylinder 244 on the carriage and which controls the main presser-levers, while the corresponding outlet of the opposite valve 293 is directly connected by an air-line 334 to the piston-chambers 235 formed in each of the presser-arms 229.

Figure 4:
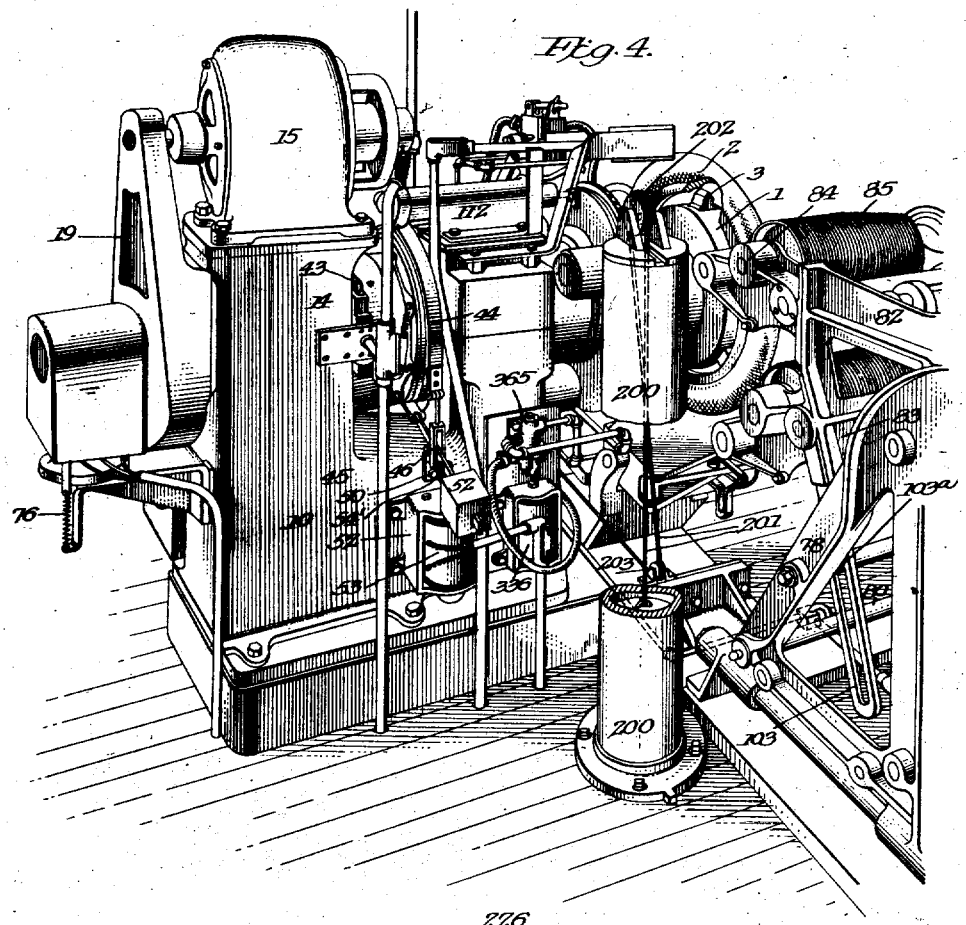
Fig. 4 is a view in perspective from the rear of the machine.
Figure 38:
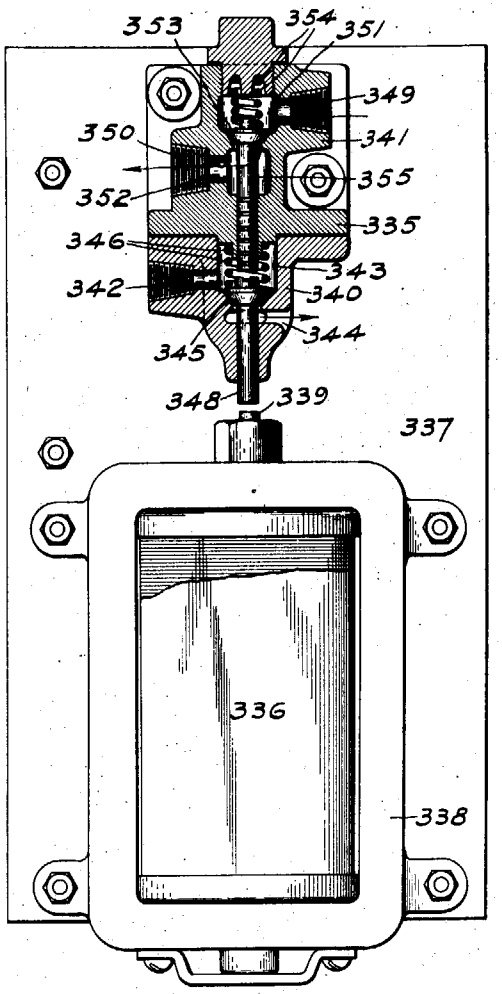
Fig. 38 is a detail view in elevation, partly in section, of the general exhaust valve employed in the pneumatic control system, showing its solenoid actuating element.

There is provided, as a part of the pressure-fluid system herein, an exhaust-valve 335 (Fig. 38) which serves the two-way cylinder 244 that is electro-mechanically controlled automatically by a solenoid 336. Both the exhaust-valve and the solenoid are suspended from a support 337 attached to a portion of the machine, as illustrated in Fig. 4. The solenoid is mounted upon its support by a bracket 338 and is of usual construction, being provided with a core-arm 339 extending upwardly from the solenoid upon an energization thereof. The exhaust-valve 335 is supported immediately above the solenoid-bracket and is constructed in two parts 340 and 341. The lower part 340 contains an inlet 342 which communicates with a valve-chamber 343 and, through this valve-chamber, with an exhaust-vent 344. A valve-closure-member 345 is supported upon an appropriate seat and normally prevents communication between the inlet 342 and the exhaust-vent, being normally held seated through the action of the expansible spring 346. Pressure constantly exists in the exhaust-line 347 (when the valve 292, to which this exhaust-line connects, is open) and is of further assistance in maintaining the valve-closure member 345 is seated. A stem 348 is provided for the closure-member, depending therefrom, and projecting from the exhaust-valve casing into direct alinement and spaced relation with the core-arm or stem 339 of the solenoid.

Upward movement of the solenoid-arm (which is automatically effected in a manner presently to be set forth) will unseat the valve-member 345 against the combined resistance of the pressure-fluid in the valve-chamber and of the spring 346 in order to permit communication between the exhaust-inlet 342 and the vent-hole 344. The upper portion 341 of this exhaust-valve 335 is provided with an inlet 349 and an outlet 350 which are permitted communication through connected valve-chambers 351 and 352. Between these last is formed a seat for a valve-closure-member 353, the latter being also normally maintained upon its seat by the resilient action of an expansible coil-spring 354 as well as by the force of the pressure-fluid from the inlet 349. A stem 355 is provided for the valve-closure-member 353 and is projected into the valve-chamber 343 of the lower valve-portion 340. It is formed to prevent leakage along the bore in the upper valve casing provided to accommodate this projecting stem. The stem of the upper valve-member 353 terminates a short distance above the stem of the lower valve member and is in axial alinement therewith in order that upward movement of the solenoid member 339 will first actuate the lower valve and, immediately thereafter, the upper valve.

The line 272 (which has been described as one of the three emanating from the air-filter 270) connects directly with the inlet 349 of the upper valve-portion while a similar compressed air-conductor 356 extends from the outlet of the upper exhaust-valve portion to the inlet of the one-way cylinder 245. From this second filter-line 272, there branches an air-line 357 which connects with an inlet 358 of the pneumatic stock-rack control-cylinder 102. A three-way valve 359 is disposed upon this branch air-line 357 and is controlled by a foot-lever 360 (Fig. 1) being accessible to the operator as he stands before the tire-core 2. Two of the ports of the three-way valve 359 are in alinement to permit the flow of air along the branch 357 through the valve-casing into the stock-rack control-cylinder 102, while the third port 361 exhausts the air from the cylinder directly into the atmosphere while closing off the inflow of the compressed actuating fluid from the branch line 357.

Figure 37:
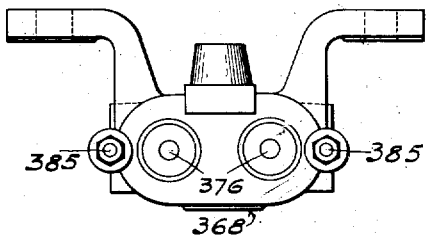
Fig. 37 is a view in top plan of the same.
Figure 35:
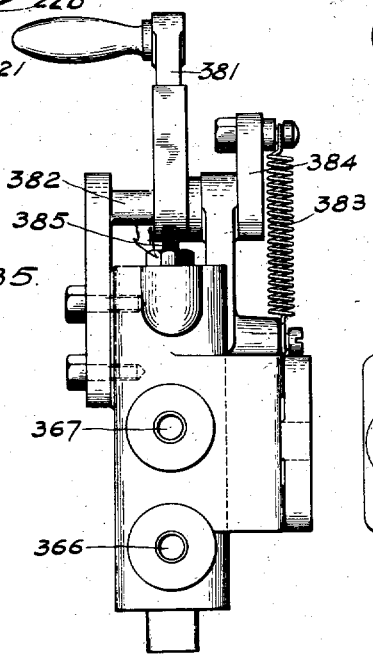
Fig. 35 is a view in side elevation of one of the pneumatic control-valves for the bead-setting device.
Figure 36:
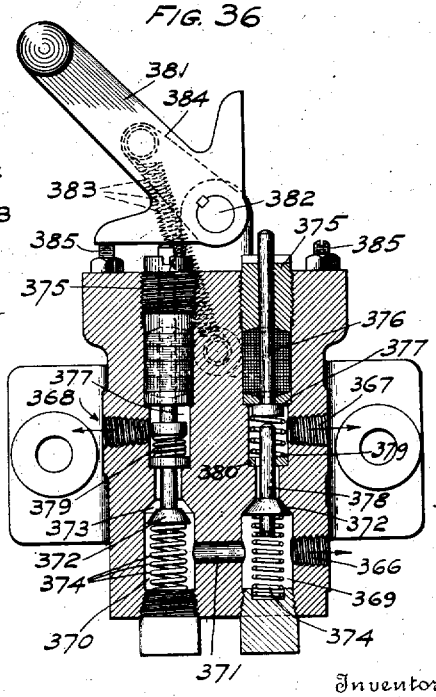
Fig. 36 is a view in cross-section of this valve.
Figure 27:
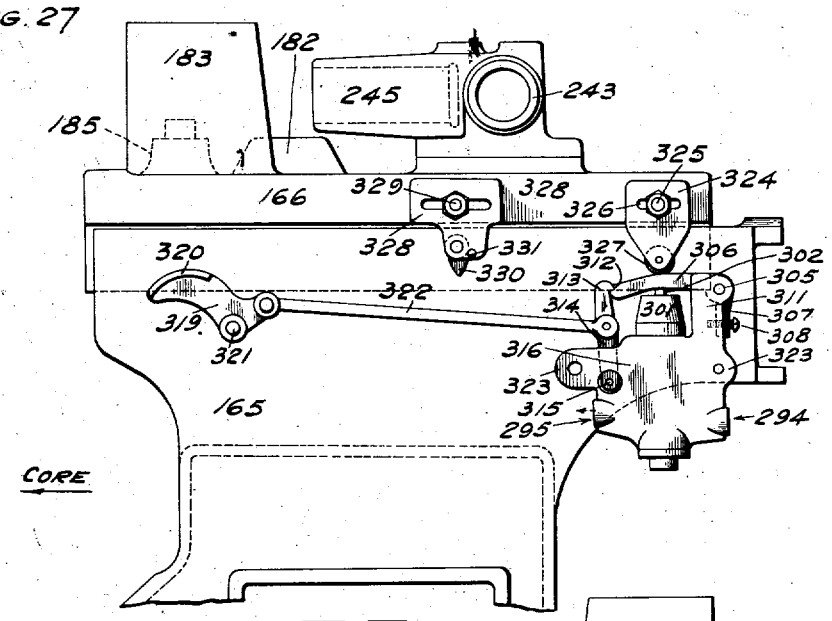
Fig. 27 is a fragmentary view in elevation of the front side of the pedestal.

The third air-line 273 which emanates from the main air-filter 270 branches off in two separate lines 362 and 363 which respectively connect with control-valves 364 and 365. The former governs the movement of the bead-setting piston within the cylinder 112 (Figs. 35, 36 and 37). This valve is of a double construction being provided with an inlet 366 and a pair of opposite outlets 367 and 368. The inlet is connected with the branch-line 362 and feeds a pair of separate valve-chambers 369 and 370 connected by an intermediate passage-way 371. Each of the valve-chambers is provided with a bore communicating with its respective outlet 367 or 368 and is normally shut off by a valve-closure-member 372 which is maintained upon its seat 373 by an expansible coil-spring 374 as well as by the pressure of the fluid in the branch-line 362. Each of the valve-bores is provided with a closure-cap 375 at its upper terminal through which there slidably extends a rod 376 of a plunger 377, the latter being normally in spaced relation from a stem 378 of the valve-closure-member and maintained in this separated position by a coil-spring 379. The latter is supported upon a collar 380, which is apertured in continuance of the valve-bore. These valves are arranged for manual operation, the control therefor including a T-arm 381 provided with a handle to be grasped by the operator, this T-arm being pivoted at 382 intermediate the projecting plunger-stems 376. A contractile coil-spring 383 extends from an arm 384 supported in alinement with the main shank of the T-member and with a point on the valve-casing which is in direct vertical alinement with the pivot of the T-member. Movement of the T-member in either direction will serve to depress one of the plunger-stems (and the appropriate valve related thereto) to establish communication between the single inlet-vent and one of the outlet-ports, the spring 383 serving to maintain the T-member in either of its forward or rear displaced positions. Stop-elements 385 are provided upon the upper portion of this valve-casing in order to limit the oscillatory movement of the actuating-member 381 in either direction.

Figure 32:
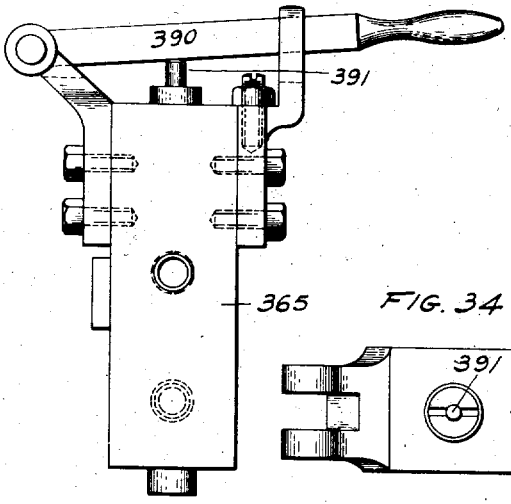
Fig. 32 is a view in elevation of one of the bead-setter pneumatic control-valves.
Figure 33:
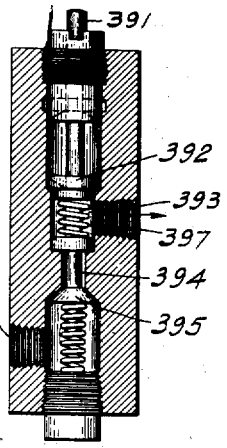
Fig. 33 is a view in cross-section of this valve.
Figure 34:
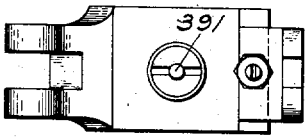
Fig. 34 is a view in top plan thereof.

From the respective outlet ports 367 and 368 of this valve extends a pair of separate air-lines 386 and 387 to opposite extremities of the pneumatic cylinder 112. Preferably, these outlet air-lines are crossed in order that movement of the piston in the cylinder 112 will be in the same direction as the lever 381 initiating the piston movement. This piston serves to move the machine-positioned bead-setting ring into place against the tire-core, or to retract the ring after the supported bead has been positioned thereby. The branch air-line 363 connects, as has been stated, with the valve 365 (Figs. 32, 33 and 34) and is provided to control the admission of air into the bead-ring-channel 130, after the ring has been moved forward into engagement with the tire-core, in order that the hand positioned ring 116 may be pneumatically clamped to the sliding bead-setter ring. This valve is provided with a lever-arm 390 exteriorly pivoted to the casing of the valve and adapted to rest upon the stem 391 of a plunger 392 which extends into a valve-bore 393. This plunger is in slidable spaced relation with a stem 394 of a valve-closure-member 395 positioned normally to close the valve-chamber 393 between an inlet 396 and an exhaust 397 of the casing. Expansible spring means are provided to maintain the valve-closure-member upon its seat in conjunction with the force of the compressed air-in the inlet 396. Depression of the pivoted lever-arm 390 serves to unseat the valve-closure-member and to establish such communication between the inlet and the outlet of the valve-casing that compressed air will be permitted to flow through an exit-line 398 of this valve into the channel of the bead-setter-ring. The admitted air will operate the respective plungers 127 (in the manner already set forth) to cause the retraction of the bead-rings simultaneously from opposite sides of the tire-core. A leak-valve 399 (Fig. 29) is placed upon the outlet-air-line from the valve 365 to reduce the air-cushion for the respective clamping pin-cylinders 128.

Figure 28:
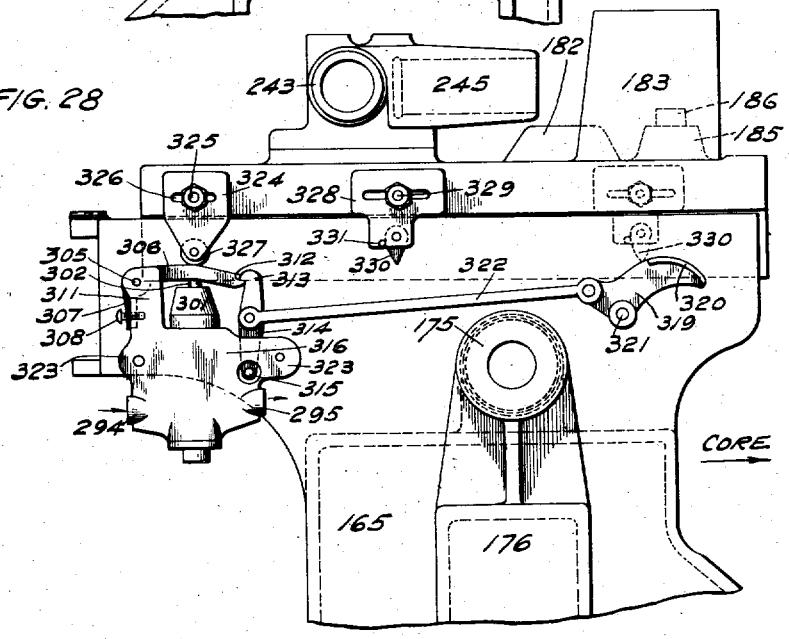
Fig. 28 is a similar view of the rear side thereof.

*8. General operation of presser-carriage.*—The operation of the presser-levers and their adjuncts as a unit is as follows: The operator, at the time of setting the carriage in motion, for the first-ply and for the fourth-play stitching operations, for instance, grips the handles 251 (Figs. 25) of the two latch-arms 248 to disengage each latch simultaneously from the yoke-pin 250. This releases the presser-rolls from the locked position. As the carriage moves forward, (when its drive-mechanism therefor is thrown, and after traveling from three-eighths to one-half of an inch forward) it withdraws the valve-closing-shoe 289 from beneath the operating-arm of the bell-crank lever 284 attached to the main shut-off valve 274. The pressure-fluid is thus permitted to pass through this control-valve from the filter-tank 270, being governed by a regulating valve 400 placed in the air-line 271, and simultaneously enters the subsidary cut-off valves 292 and 293. Since, at the start of any fabric-manipulating operation, the latter valves are held in open position by means of the locking engagement between its keeper-member 314 and the operating-arm of the valve-stem controlling bell-crank 306 of each valve, it will be apparent that pressure-fluid will be permitted to flow through both of these valves to the two-way cylinder 244 (this controlling the presser-levers 229) and also, the separate cylinders 235 provided, one on each lever. The pressure-fluid, having entered the two-way cylinder 244, causes movement of the pistons 247 in opposite directions, and thereby effects a consequent approach toward each other of the presser-rolls which are carried at the forward extremities of the pair of presser-levers. The stop-pins 186 limit this initial movement of the levers. At the same time that these rolls are brought into proximity (in order that they may commence their manipulating operation adjacent the center line of the tire-core) the pressure-fluid admitted into the separate piston-cylinders 235 will have caused an outward movement of the individual pistons 237 for each of the cylinders. As the carriage advances toward the tire-core, the presser-rolls are, thus, forced outwardly to their limit of movement and into the position illustrated in Fig. 25. Then, as the rolls engage the surface of the carcass-ply being laid onto the tire-core, the stop-pins 186 are released from their frictional engagement with the levers and retracted. The air-cushion intermediate the pistons of the two-way cylinder 244 causes a constant pressure between each of the rolls and the fabric engaged thereby. This pressure is readily gaged by the selection of an appropriate leak-valve to control the amount of pressure within this two-way cylinder. As the core rotates the carcass-ply while the carriage advances with its presser-rolls engaging the ply, every portion of the ply will be rolled into engagement with the surface of the core, or of the previously-applied ply beneath. In this manner, the rolls progress around their particular portion of the lateral curvature of the core until, for a so-called "under-bead" operation, they have reached a point at or somewhat beyond the so-called "trim-line", whereupon they are restored to normal position in a manner presently to be explained. For a so-called "over-bead" operation, the rolls progress in the same way until they reach a point adjacent the so-called "valley" of the beads, whereupon a change in the angularity of the rolls is effected. At this point, the trip 330 Fig. 28 which is carried by the carriage, in control of the cut-off valve 293, engages its cam-member 320 and serves to disconnect the keeper-member 314 and the operating bell-crank which controls this valve. This permits a closure of the valve and a consequent cutting-off of the pressure-fluid supply to the lever-pistons 237. As the carriage continues to advance, the resistance of the fabric, the added resistance to the presser rolls of the beads after the latter shall have been positioned at opposite sides of the fabric-covered core, and the action of the arm-springs 232 cause a retraction of the separate pistons 237 into their respective cylinders, the air leaking out through pop-valves (such as the valve 242) with which these cylinders are equipped. The arm-links 238 are then retracted into their cylinders 235 until the spring-pressed latches 248 can again lock the yoke-arms 239 in their initial position. At this time, the trip-member 330, governing the other cut-off valve 292, engages its cam and, in turn, disengages the keeper and the bell-crank control of this valve, cutting out the supply of pressure-fluid to the two-way cylinder 244. Immediately thereafter, at the conclusion of the pressing operation, the electro-mechanical trip connections (shown in Figs. 3 and 29) become active. These trip connections include a bar 405 supported upon the pedestal 165 in parallel relation to the course of travel of the carriage 166, as is indicated in Fig. 3. This bar extends from an electrical control-box 406 and is equipped with a pair of spaced contact-making disks 407. The electrical circuit, of which this bar forms a part, leads through the solenoid 336 and energizes the latter when the circuit is completed. A closing of the circuit is accomplished by the contact of either of two carriage-supported pins 408 and 409 with either of the disks 407. These pins are carried upon the carriage and, preferably, upon one of its side-walls 183 so that they are given a path of movement between the spaced contact-disks 407 with a capacity to contact with either and, in so doing, complete the circuit through the solenoid 336. The pin 408 is fixed to the side of the carriage and is normally in contact with the rear bar-disk 407 because the solenoid must be energized to open the vent 344 of the exhaust-valve 335 prior to the beginning of any pressing operation. As the carriage continues to move forward, this contact is broken and is not re-established until the carriage reaches the limit of its advancing movement. Then, either the pin 408 or the pin 409 will engage the contact-disk 407 and again complete the circuit through the solenoid, thus re-opening the exhaust-valve 335.

It is to be understood, however, that the carriage has a variable forward movement, a longer distance of travel being required for the carriage when the fabric-pressing members are to perform their "over-bead" operations to lay down the outer plies of fabric which encompass the beads of the carcass than is necessary when the fabric-pressing members perform their "under-bead" operations to lay down the shorter plies of fabric of which the carcass is made prior to the positioning thereon of the beads. The stationary contact-pin 408 provides only for the longer travel of the carriage, the shorter travel thereof necessitating the use of the changeable pin 409 which is positioned upon the carriage slightly in advance of the fixed pin 408 and is mounted upon a turn-bolt 410. In Fig. 29 the parts are shown in the position for the shorter travel and so that as the pin 409 will contact with the disk 407 and complete the circuit through the solenoid sometime in advance of the fixed pin 408. When the movable pin 409 is turned into the dotted-line position of Fig. 29, the parts are set for the longer travel of the carriage. The wiring of the parts comprising the electro-mechanical trip will presently be more fully described. In either case, the solenoid is energized to open the lower closure-member 345 of the exhaust-valve 340, thus venting the cushioned pressure-fluid from between the pistons in the two-way cylinder 244. As the solenoid-core continues to move, the upper closure-member 353 of the exhaust valve is removed from its seat immediately after the air-cushion in the two-way cylinder has been vented, to permit the pressure-fluid from the line 272 to flow through the upper portion of the exhaust-valve-casing and, thus, into the single cylinder 245. The piston of this cylinder is at once forced outwardly to engage the lateral lugs 236 which project from the respective presser-levers into its path, effecting spreading apart of the presser-levers so that the individual presser-rolls are separated and disengaged from all contact with the tire-carcass.

Figure 39:
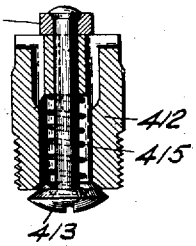
Fig. 39 is a detail view in section of one of the several pressure-regulating valves employed at various points along lines of the pneumatic control system.

The carriage may then be retracted, as previously set forth, its arrival at the limit of its receding movement closing the general shut-off valve 274 by an interposition of the shoe member 289 between the operating-arm of the valve bell-crank 284 and the valve-stem normally depressed thereby. Thus, the continued flow of pressure-fluid to the carriage-cylinders is cut off, while all fluid remaining in the various piping-systems is vented from the several lines, or allowed to exhaust itself through the leak valves arranged thereon at suitable points. In Fig. 39, there is shown one type of leak-exhaust valve which may desirably be employed. It includes a bored cylinder 412, threaded at one end for removable securement to a pipe-line. A valve-member 413 is mounted by its stem 414 in such way as to close the core of the cylinder across the lower mouth thereof. An expansible spring 415, however, is provided in contact with the valve and of such strength that it tends to unseat the valve 413, unless a certain fluid-pressure is maintained in the piping to which the exhaust-valve is attached. While a continuous inflow of pressure-fluid is sufficient to hold the valve 413 seated, a cutting off of the fluid-supply, and the consequent reduction of pressure in the line, permit the spring to unseat the valve and exhaust all air from the line.

Figure 41:
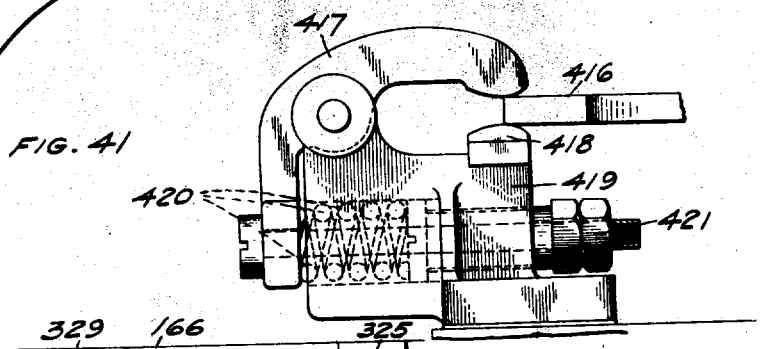
Fig. 41 is a fragmentary detail view in elevation of the vibration-absorber employed in conjunction with the presser-supporting levers.

Among the other auxiliary mechanisms provided herein, is a vibration-absorber to render the action of the fabric-pressing member smoother. This device is shown in detail in Fig. 41. It comprises a finger-plate 416 secured in lateral projection to each lever 229 and is in frictional engagement with a spring-pressed arm 417 and a fixed bumper-plate 418. The latter is secured upon the upper portion of a casing 419 which houses a spring 420 and also pivotally mounts the arm 417. The spring 420 is expansible and tends to force the free end of the arm 417 down upon the bumper-plate. An adjusting device 421 is provided to tension the spring 420. All vibrations of the presser-levers which tend to produce uneven work on the applied fabric are successfully absorbed by use of this device.

Figure 42:
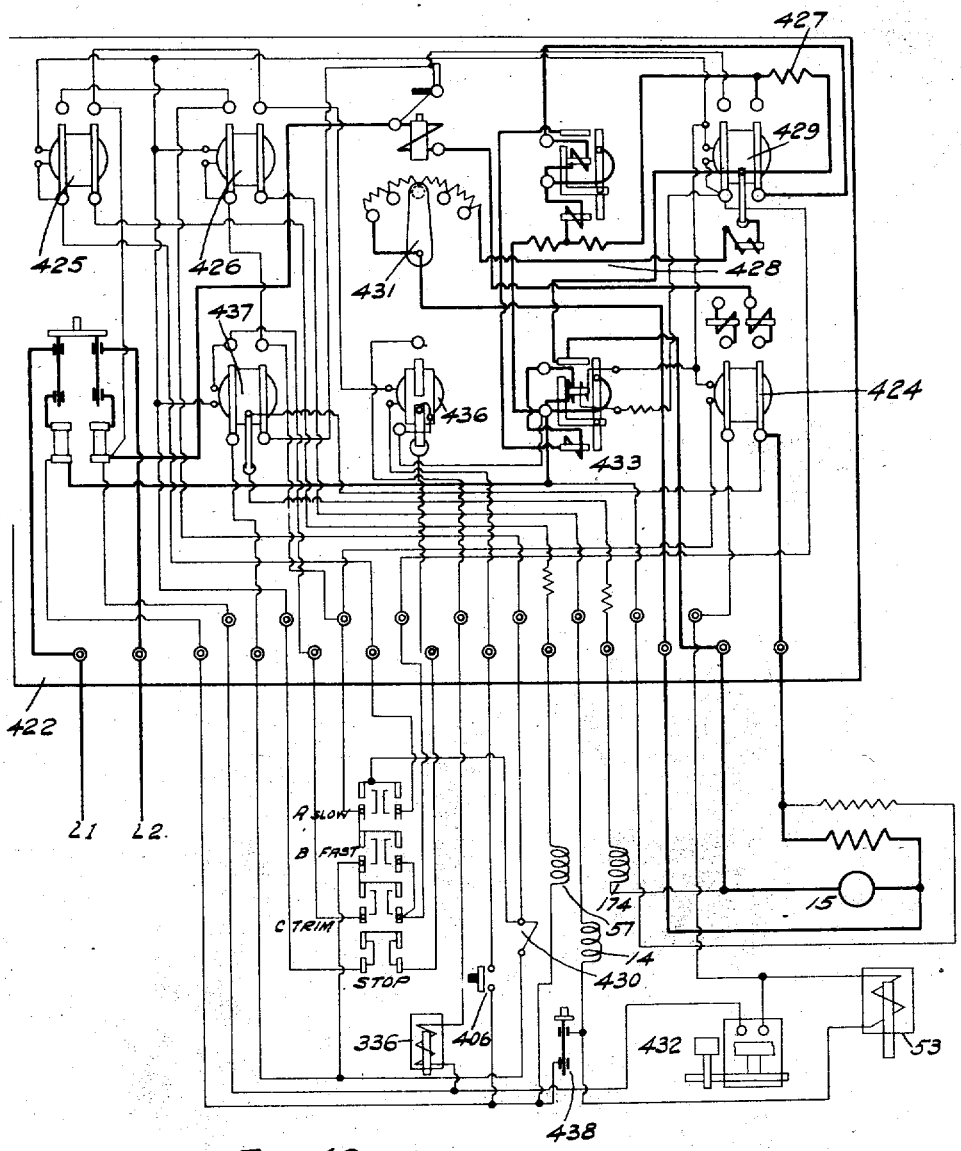
Fig. 42 is a diagrammatic view of the electrical control connections.
Figure 43:
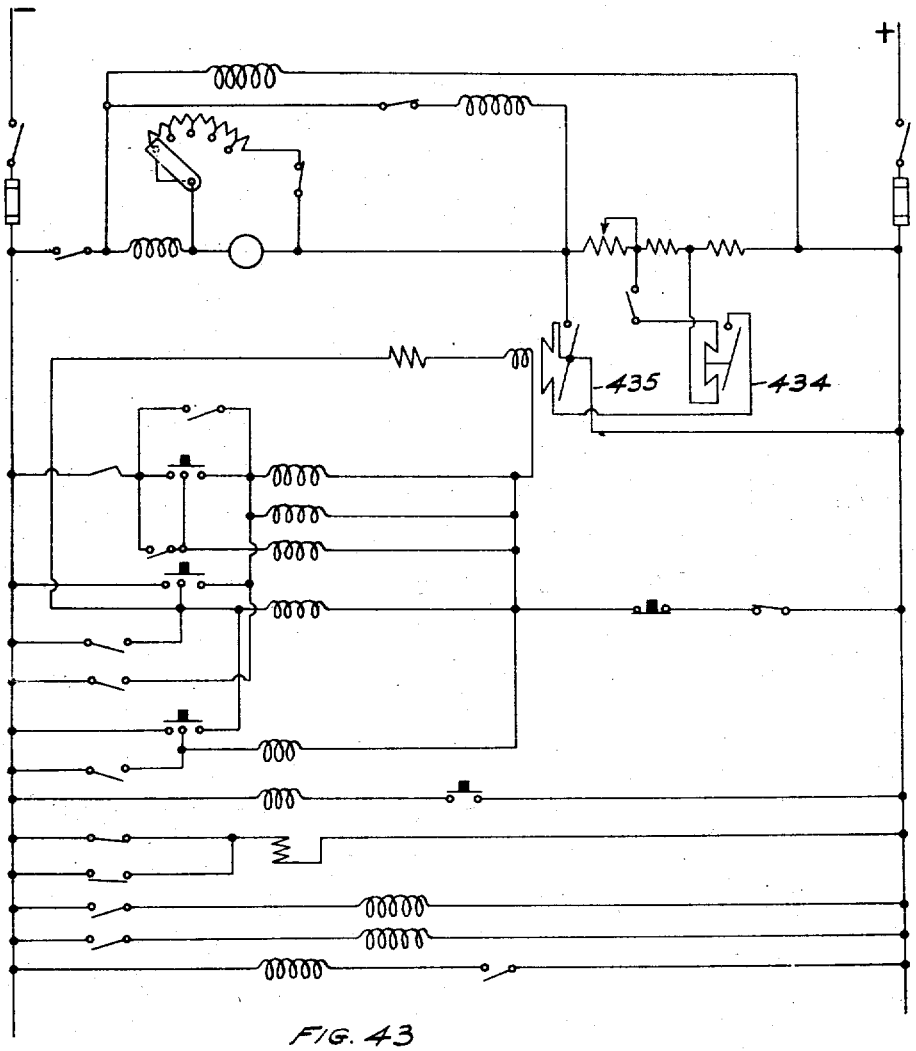
Fig. 43 is a simplified schematic diagram of the same.

9. *Wiring system.*—In Figs. 42 and 43 we have illustrated, diagrammatically, a wiring system involved in facilitating the control of various parts of the machine:

The electrical equipment of the machine consists, generally, of the driving motor 15, a control-panel 422 including a station 423 (Fig. 1), and the accessories thereof. The function of the electrical equipment is to govern the speed, etc., of the motor which drives the tire-core and also, in conjunction with the pneumatic devices, controls the operating mechanism of the fabric-manipulating structure.

Assuming that the tire-core is positioned on its support, the operation of the electrical equipment is as follows: First, the fabric is attached to the tire-core, and, then, a button marked A ("Slow") is momentarily pressed. This establishes a circuit for a main switch coil 424, a relay-coil 425, and a relay-coil 426. Closing of the switch 424 places the motor across the line in series with starting resistances 427 and 428. A relay 429 has a "down"-contact which maintains an armature-shunt-circuit so long as the relay is in the deenergized position. The main switch 424 maintains itself through the time-clutch-contact 67 of the "time switch" 430. The motor will turn over at a slow speed because of the armature-series-resistance 427 and 428, and an armature-shunt resistance 431. The brake 44 will then be released.

It will be understood that the solenoid 57 is linked in series with the drive-motor 15 and with the said resistances. This arrangement affords a rotation of the drive-shaft 13 at a much slower speed than that which is attained by employing a second circuit for the motor that would carry through an increased amount of resistance and be controllable by a separate button. The throw of the time-switch 430 which is controlled by the "slow"-speed button, causes the main drive spindle 13 to rotate slowly and, at the same time, energizes the solenoid 57 in order to mate the clutch part 58 with the drum 55. As the shaft is nearing the completion of one revolution at this slow speed, the contact-breaking-lug 70 interrupts the circuit and cuts off the drive for the spindle 13 and deenergizes the solenoid 57. This permits the clutch-part 58 again to ride free upon the rear extremity of the shaft-plug 56, and permits the spring-motor 76 to return the clutch-part to its normal position by unwinding the flexible connection 74 from the drum to which it is attached. Although the return motion imparted to the clutch-member 58 by the spring-motor is somewhat sudden, the stop-plug 71 cushions the clutch-part against the recoil. The single revolution of the core-shaft 5 which is thus obtained at a slow speed with an automatic mechanical arrest is utilized by the operator of the machine while pulling the fabric onto the core from the stock-rack, one revolution of the core-shaft 5 being sufficient to pull a complete annular ply from the stock-rack upon the core.

When the relay 425 closes, it energizes the time-clutch and establishes its own maintaining circuit. When the relay 426 closes, it energizes the main-switch and maintains itself. The main clutch 14 connects the driving motor 15 to the tire-core drive through the time-clutch. After the core has made approximately 15/16ths of a revolution, the time-switch 430 opens, thus opening the main switch and disengaging the main and timing clutches. This stops the motor, releases the clutches, and applies the magnet-brake 44, thus providing a quick stop for the tire-core.

To turn the tire-core by hand for inspection, etc., it is only necessary to operate a foot-switch 432, which releases the magnet-brake and leaves the tire-core free to revolve.

The next operation is laying and pressing the fabric. This is accomplished by running the tire-core at high speed and allowing the fabric-manipulating mechanism to operate. To obtain high speed, button B ("Fast") is momentarily pressed. The main switch closes to release the magnet-brake. Then the relay 426 closes and energizes the main clutch 14 and connects the motor to the core. The relay 429 then closes and maintains itself. It also closes a circuit for a holding coil of an accelerating-switch 433. When this relay 429 closes, it interrupts the armature-shunt circuit and cuts out one step of the armature-accelerating-resistance 428. Further acceleration is controlled by magnetic lockout-switches 434 and 435, which bring the motor up to full speed. The presser-carriage-clutch 174 is energized by motor C. E. M. F., so that when the speed is high enough, the carriage automatically advances. When the fabric is all rolled onto the core, the limit-switch 406 closes, energizing a relay 436. This opens the air-valve 335 and permits the carriage to be returned to starting position. It also stops the motor and applies the magnet-brake. This latter function is obtained by means of a "down"-contact on the relay 436.

The trimming operation comes next: During this operation, the core generally runs at high speed. The trimmers cut off the stray ends of fabric. To do this, a "Trim" button C is pressed. This closes the magnet main switch 424, the relay 429, a trim relay 427, and the relay 426. This releases the carriage-clutch, so that it cannot travel during the trimming period. It also accelerates the motor up to maximum speed after releasing the magnet-brake. The main clutch is energized. A knife-switch 438 is provided which, when open, allows operation of the carriage without having the tire-core revolve. It is to be noted that this knife-switch, when open, leaves the main clutch deenergized, thus preventing the connection between the motor and the tire-core. It also opens the circuit for the magnet-brake which holds the tire-core securely in a stationary position.

*Operation in general.*—The operation of this machine will be more or less apparent from the foregoing description; but the following, in connection especially with Figs. 1, 3, 6 and 29, will serve to explain it more particularly: The foot-lever 360 is actuated to effect a selection of the desired stock-supplying roll and to position it in a proper plane with respect to the core 2. The operator then initially attaches the free end of the tire-fabric from that roll to the core. He then pushes the "Slow" button (A), whereupon the core is set into rotation at slow speed so that the core may make a single revolution and then automatically stop. It, while rotating, effects a withdrawal of the tire-fabric from its roll and initially positions the same about the surface of the core. The fabric, during this operation, is longitudinally stretched along its medial portion, the tension on the fabric-roller contributing to this result. The operator, then having cut the ply to proper length, after the core has been arrested, as aforementioned, pushes the "Fast" button (B) to set the core into motion at high speed. He then also operates the hand-lever 266 to position the tread-laying rolls 254 into engagement with the fabric on the core to effect a laying of the tread portion of the fabric. The lever 180 may then be operated to cause the carriage to advance toward the core first at slow speed and then at high speed. As the carriage advances toward the core, the presser-rolls 215—216 initially engage therewith and then perform their aforementioned function of pressing and stretching the fabric about the sides of the core. That is to say, assuming that a ply of fabric has been properly applied to and stretched and laid upon the core, preparatory to action thereon by the presser rolls, pressure-fluid having been admitted to the cylinders 244 and 235, such fluid will force the pistons therein forward and thereby develop a lateral as well as a radial tension upon the arms 229 and, at the same time, cause the stitcher supporting arms 226 to be swung to their outmost forward position. The rolls will remain in this position until they engage the core. The carriage, in the interim, will have been set in motion and, just after the presser rolls have engaged the core, the pins 186 will be withdrawn sufficiently to permit the presser rolls to perform their stitching operation. These rolls—in operating in connection with the stitching down of the first and second plies—act upon the fabric until the trim-line of the core is reached, which will be approximately when the rolls have progressed down to the neck or shank of the core. Thereupon the automatic release-mechanism for the control of the pressure fluid is brought into operation, and the presser rolls are then returned to their initial position. For the first and second plies, no change is necessarily made in the angular relation of the presser rolls with respect to the core, and it will be understood, therefore, that these rolls remain in their initial angular position until the ply has been stitched down to a point below the trim-line, whereupon the pressure fluid to the cylinders 244 and 235 is released and admitted to the cylinder 245 to operate the piston 246, and engage the lugs 236 carried by the cylinders 235, thereby causing them to be thrust forward to release the pressure rolls from the core and permit them to return to their initial position, as already mentioned. This, in general, is the operation for the first and second plies. In operating for stitching down the third and fourth plies, the foregoing description of operation is applicable until the presser rolls shall have reached a point adjacent the "valley" of the beads. At this point, the angular relation of the presser rolls is desirably changed, and this is accomplished by the operation of another automatic trip which is brought into action to shut off the pressure fluid through the cylinders 235 and exhaust the fluid therefrom, whereupon the pistons 237 are immediately permitted to be retracted to their innermost position. This action is accomplished by two factors, namely, the frictional engagement of the presser rolls with the fabric on the core and, particularly, in the "valley" of the beads and, secondly, by the springs 232, mounted about the pivot 228 of the main stitcher supporting arms 226, being made active. In other words, when the pressure fluid is exhausted from the cylinders 235, the presser rolls will be permitted to have frictional contact in the "valley" of the beads, and the springs 232 will operate to force the pistons 237 rearwardly until the pistons 250 engage the latch members 248, whereupon the further advance of the carriage mechanism will cause the presser rolls to stitch the fabric up over the "heel" of the bead and down to the "toe" thereof. As soon as the pistons 237 have reached their innermost position, as aforementioned, the latch members 248 snap over the latch pins 250 to retain the stitcher supporting arms from again moving forward. The purpose in locking the parts in this manner and at this point is to prevent the presser rolls from swinging forward and thereby break their frictional contact with the lower surfaces of the beads. Meanwhile, the carriage will have advanced a short distance to cause the presser rolls to ride up over the heels of the beads, whereupon, upon further advancing movement of the carriage, the presser rolls will stitch the fabric down to the trim-line. As soon as the rolls reach this trim-line, the pressure fluid is exhausted from the cylinders 244 and admitted to the cylinder 245 which immediately operates the stitcher carrying arms and effects a disengagement of the rolls from the carcass. Upon completion of the stitching strokes of the presser rolls, the carriage, together with the stitcher supporting arms, are returned to their initial positions, pistons 237 still remaining in their retracted positions, being held there by the latch members 248 until the beginning of the next stitching operation, whereupon they are manually released to permit the pressure fluid in the cylinder 245 to project them forward, as before. Such manual release is accomplished by the operator clasping the latch handles 251 to cause them to be retracted from their positions in contact with the pins 250, and this results in permitting the air in the cylinders 235 again to operate the pistons 237 to project them forward. It will now be understood, therefore, to permit the presser rolls to operate in the manner described, for successively stitching down each of the several plies, it is necessary that they be released from a spreading-apart movement. During the advancing travel of the carriage, the trip 289 disengages from the arm 284 to permit the pressure-fluid to pass through the circulation system to valves 292 and 293 which, during the initial stages of the advancing movement of the carriage, are open. Then the operator manually unlatches the catches 251 so that the roll-supporting arms 239 are free to be actuated by the pressure-fluid in the cylinders 235 and to swing on their axes 227 to dispose them in proper angular relation with respect to the surface of the core. About the same time, the fluid-pressure in the cylinders 244 swings the arms 229 on their axes 234 to cause the presser-rolls to have a tendency to swing toward each other, which swinging movement of these arms is permitted by the automatic disengagement with the arms of the pins 186. The operation of these pins, as already described, is controlled by the riding of the cam 192 off the arm 190 to permit rocking of the shaft 187 under the action of the shaft-rotating spring 191.

As the carriage continues to advance, for an "under-bead" operation, the contact-member 409 engages the stop 407 to close the electric circuit and energize the solenoid 336. This latter then actuates the valve 345 to permit the pressure-fluid to exhaust through the valve 335 from the cylinders 244 and 245; a continued movement of the solenoid opening the valve 353 to permit the pressure-fluid then to flow into the central cylinder 245. The piston 246 therein effects a spreading of the arms 229, this being accomplished by the front end of the piston engaging the lugs 236 formed on the arms. When the presser-rolls reach the toes of the core, the springs 233 become active to hold them yieldingly in engagement with the core.

When the carriage has reached a position toward the end of its advancing movement, it is automatically arrested: This is accomplished when the contact-member 408 engages the stop 407, and the solenoid is operated, as just described. This solenoid is in circuit with the magnetic clutch 174 and the latter is thereby operated to disconnect the carriage from its drive; whereupon the weight-motor returns the carriage to starting position.

When a sufficient number of fabric-plies have been superposed upon the core, the bead-setting structure is brought into operation for the purpose of positioning beads on opposite sides of the core: To this end, the operator actuates the lever 381 to thrust the bead-holding ring 105 toward the fabric-covered surface of the core. He also manually swings the bead-holding ring 116 toward the opposite side of the fabric-covered core. When the bead-holding rings are on opposite sides of the core, the hook 123 engages with the head 126 attached to the piston 127 which moves in the cylinder 128. Pressure-fluid then being admitted into the cylinders 128, the operator, for this purpose, moving the lever 390, the pressure of the fluid on the pistons causes them to move and draw the bead-holding rings toward each other and thereby firmly secure the beads in position on opposite sides of the core. When the beads are thus properly placed, the operator swings the lever 390 in the opposite direction to cut off the flow of pressure-fluid into the cylinders 128, whereupon the springs 129 become active to force the heads 126 on the pistons outwardly and, thus, release them from locking engagement with the catches 123. The air exhausts through one or another of the leak-valves, already mentioned, in the circulation system.

The machine is then ready for the "over-bead" operation; and, for this, the operator removes the contact 409 so that pin 408 will engage with the stop 407, the action of the carriage and of the presser-rolls thus being controlled so that they will have movement up, over and around the beads and down to the toe of the core, when the action of the presser-rolls and carriage is arrested, in the manner already described.

After this "over-bead" operation is completed, the trimming mechanism, already described, is brought into operation, this being effected by the operator depressing the lever 161 to engage the cutters 149 with the fabric on the core, the latter continuing to rotate so that the cutters will trim the surplus fabric that is beyond the cores.

What we claim is:

1. A tire-making machine including a presser-supporting carriage, mechanism for actuating the carriage for a to-and-fro movement, a presser-member movable on the carriage, fluid-pressure means operable independently of the carriage-actuating mechanism for moving the member on the carriage in one direction, and fluid-pressure means operable independently of the carriage-actuating mechanism and of the first mentioned pressure-means for returning the member to its initial position.

2. A tire-making machine including a tire-forming core, a presser-supporting carriage movable in respect to the core, mechanism for actuating the carriage for a to-and-fro movement in relation to the core, a pair of pressers on the carriage also movable in respect to the core and independently of the carriage-movement, fluid-pressure means for operating the pressers toward the core, and fluid-pressure means operable independently of the carriage-actuating mechanism and of the first-mentioned pressure-means for moving the pressers away from the core.

3. A tire-making machine including a tire-building core, a presser-supporting carriage movable in respect thereto, pressers on the support and movable in respect to the core, fluid-pressure operated means for moving the pressers toward the core, fluid-pressure operated means for moving the pressers away from the core, and independent means for moving the carriage in respect to the core.

4. A tire-making machine including a tire-building core, a presser-supporting carriage movable in respect thereto, pressers on the support and movable in respect to the core, fluid-pressure operated means for moving the pressers toward the core, fluid-pressure operated means for moving the pressers away from the core, independent means for moving the carriage in respect to the core, and means operable during the travel of the carriage in relation to the core for arresting its travel and for actuating one of said fluid-pressure operated means.

5. A tire-making machine including a tire-building core, a presser-supporting carriage movable in respect thereto, pressers on the support and movable in respect to the core, fluid-pressure operated means for moving the pressers toward the core, fluid-pressure operated means for moving the pressers away from the core, independent means for moving the carriage in respect to the core, and means common to said carriage-moving means and one of said fluid-pressure operated means for automatically arresting travel of the carriage and for actuating said fluid-pressure operated means.

6. A tire-making machine including a tire-building core, a carriage having advancing and receding movements in relation to the core, fabric-pressing mechanism on the carriage and including supporting members and fabric-pressers carried thereby, fluid-pressure operated means for swinging said members in one direction to position said pressers toward the core, and fluid-pressure operated means for spreading said members apart to position the pressers away from the core.

7. A tire-making machine including a tire-building core, a carriage having advancing and receding movements in relation to the core, fabric-pressing mechanism on the carriage and including supporting members and fabric-pressers carried thereby, fluid-pressure operated means for swinging said members in one direction to position said pressers toward the core, fluid-pressure operated means for spreading said members apart to position the pressers away from the core, and means for locking said members against movement toward the core.

8. A tire-making machine including a tire-building core, a carriage having advancing and receding movements in relation to the core, fabric-pressing mechanism on the carriage and including supporting members and fabric-pressers carried thereby, fluid-pressure operated means for swinging said members in one direction to position said pressers toward the core, fluid-pressure operated means for spreading said members apart to position the pressers away from the core, and manually-operated means for locking said members against movement toward the core.

9. A tire-making machine including a tire-building core, a carriage having advancing and receding movements in relation to the core, fabric-pressing mechanism on the carriage and including supporting members and fabric-pressers carried thereby, fluid-pressure operated means for swinging said members in one direction to position said pressers toward the core, fluid-pressure operated means for spreading said members apart to position the pressers away from the core, and means for automatically locking said members against movement toward the core, said automatic means becoming operative when the fluid-pressure-operated means, which is normally active to swing said members in one direction, is automatically released or thrown into inoperative position.

10. A tire-making machine including a tire-building core, a support juxtaposed thereto, fabric-pressers positionable in respect to the core, presser-members movably mounted on the support, fluid-pressure operated means for swinging said members to position the pressers toward the core, independent means having a normal tendency to press the members toward the core, and fluid-pressure operated means for positioning the pressers away from the core.

11. A tire-making machine including a tire-building core, a support juxtaposed thereto, swinging members on the support, fluid-pressure operated means for actuating said swinging members to move them toward the core, presser-supporting elements movably supported upon said swinging members, and fluid-pressure operated means for actuating said elements to position said pressers toward the core.

12. A tire-making machine including a tire-building core, a support juxtaposed thereto, swinging members on the support, fluid-pressure operated means for actuating said swinging members to move them toward the core, presser-supporting elements movably supported upon said swinging members, fluid-pressure operated means for actuating said elements to position said pressers toward the core, and fluid-pressure operated means for swinging said members away from the core.

13. A tire-making machine including a tire-building core, a support juxtaposed thereto, swinging members on the support, fluid-pressure operated means for actuating said swinging members to move them toward the core, pressure-supporting elements movably supported upon said swinging members, fluid-pressure operated means for actuating said elements to position said pressers toward the core, fluid-pressure operated means for swinging said members away from the core, and automatically positioning devices engageable with the members for holding them in a spread-apart position.

14. A tire-making machine including a tire-building core, a support juxtaposed thereto, swinging members on the support, fluid-pressure operated means for actuating said swinging members to move them toward the core, pressure-supporting elements movably supported upon said swinging members, fluid-pressure operated means for actuating said elements to position said pressers toward the core, fluid-pressure operated means for swinging said members away from the core, and resilient means active on said presser-supporting elements for actuating them independent of said fluid-pressure operated means.

15. A tire-making machine including a tire-building core, a support juxtaposed thereto, swinging members on the support and having movement in respect to the core, fluid-pressure operated means connected to said members for swinging them in one direction toward the core, independent fluid-pressure operated means engageable with said members for swinging them away from the core, presser-supporting elements carried by said members, fabric-pressers sustained by said elements, and fluid-pressure operated means carried by said members and active on said elements for positioning them in respect to the core.

16. A tire-making machine including a tire-building core, a support juxtaposed thereto, swinging members on the support and having movement in respect to the core, fluid-pressure operated means connected to said members for swinging them in one direction toward the core, independent fluid-pressure operated means engageable with said members for swinging them away from the core, presser-supporting elements carried by said members, fabric-pressers sustained by said elements, fluid-pressure operated means carried by said members and active on said elements for positioning them in respect to the core, and resilient means also carried by said members and active on said elements for maintaining the pressers in yielding engagement with the core.

17. A tire-making machine including a tire-building core, a support juxtaposed thereto, swinging members on the support and movable in respect to the core, pneumatic means sustained by the support and active on said members for swinging them toward the core, juxtaposed pneumatic means engageable with said members for effecting a separating movement thereof to position them away from the core, presser-supporting elements carried by said members, fabric-pressers on said elements, pneumatic means on the members and connected to said elements for moving the pressers in respect to the core, means for supplying pressure-fluid to said pneumatic means, and means for automatically controlling the flow of the pressure-fluid to said pneumatic means.

18. A tire-making machine including a tire-building core, a carriage movable in respect to the core, swinging members on the carriage, pneumatic means for actuating said members in one direction, pressers mounted on and movable with the members, member-holding devices on the carriage and engageable with the members, and means for automatically actuating said holding devices to position them into and out of engagement with the members.

19. A tire-making machine including a tire-building core, a carriage movable in respect to the core, swinging members on the carriage, pneumatic means for actuating said members in one direction, pressers mounted on and movable with the members, member-holding devices on the carriage and engageable with the members, means for automatically actuating said holding devices to position them into and out of engagement with the members including a bell-crank lever, means connected thereto for actuating the same in one direction, and means engageable with the lever for actuating it in the opposite direction.

20. A tire-making machine including a tire-building core, a carriage movable in respect to the core, swinging members on the carriage, pneumatic means for actuating said members in one direction, pressers mounted on and movable with the members, member-holding devices on the carriage and engageable with the members, means for automatically actuating said holding devices to position them into and out of engagement with the members including a bell-crank lever, means connected thereto for actuating the same in one direction, and means engageable with the lever for actuating it in the opposite direction and comprising a cam slidable on the carriage and positionable in the path of movement of the lever.

21. A tire-making machine including a tire-building core, a carriage movable in respect to the core, swinging members on the carriage, pneumatic means for actuating said members in one direction, pressers mounted on and movable with the members, member-holding devices in the carriage and engageable with the members, means for automatically actuating said holding devices to position them into and out of engagement with the members including a bell-crank lever, means connected thereto for actuating the same in one direction, and means engageable with the lever for actuating it in the opposite direction and comprising a cam slidable on the carriage and positionable in the path of movement of the lever, and resilient means for moving said cam in one direction.

22. A tire-making machine including a tire-building-core, a carriage movable in respect to the core, swinging members on the carriage, pneumatic means for actuating said members in one direction, pressers mounted on and movable with the members, member-holding devices on the carriage and engageable with the members, means for automatically actuating said holding devices to position them into and out of engagement with the members including a bell-crank lever, means connected thereto for actuating the same in one direction, means engageable with the lever for actuating it in the opposite direction and comprising a cam slidable on the carriage and positionable in the path of movement of the lever, resilient means for moving said cam in one direction, and an abutment juxtaposed to the carriage and engageable by said cam for moving the latter in the opposite direction.

23. A tire-making machine including a tire-building core, a carriage having advancing and receding movements in respect thereto, presser-supporting members swingingly mounted on the carriage, member-engaging pins supported in the carriage and engageable with the swinging members, and means for operating said pins including a bell-crank-lever fulcrumed on the carriage, a spring for actuating said lever in one direction, a cam engageable with said lever for moving it in the opposite direction, a spring for shifting said cam in the direction of receding movement of the carriage, an extension on said cam, and an abutment juxtaposed to the carriage and engageable by said extension for shifting the cam in the direction of the advancing movement of the carriage.

24. A tire-making machine including a tire-building core, a carriage having advancing and receding movements in respect thereto, presser-supporting members swingingly mounted on the carriage, member-engaging pins supported on the carriage and engageable with the swinging members, and means for operating said pins including a bell-crank lever fulcrumed on the carriage, a spring for actuating said lever in one direction, a cam engageable with said lever for moving it in the opposite direction, a spring for shifting said cam in the direction of receding movement of the carriage, an extension on said cam, an abutment juxtaposed to the carriage, and engageable by said extension for shifting the cam in the direction of the advancing movement of the carriage, and cushioning means engageable by said extension.

25. A tire-making machine including a tire-building core, a carriage having advancing and receding movements in respect thereto, fabric-pressers carried by and movable with the carriage, and fluid-pressure operated means for positioning said fabric-pressers in respect to the core, including a primary fluid-controlling instrumentality, a plurality of secondary fluid-controlling instrumentalities connected therewith, and means operable during the movement of the carriage for making said primary fluid-controlling instrumentality active.

26. A tire-making machine including a tire-building core, a carriage having advancing and receding movements in respect thereto, fabric-pressers carried by and movable with the carriage, and fluid-pressure operated means for positioning said fabric-pressers in respect to the core, including a primary fluid-controlling instrumentality, a plurality of secondary fluid-controlling instrumentalities connected therewith, means operable during the initial movement of the carriage for making said primary fluid-controlling instrumentality active, and independent means operable during a later stage of the travel of the carriage for rendering said secondary fluid-controlling instrumentalities active.

27. A tire-making machine including a tire-building core, a carriage having advancing and receding movements in respect thereto, fabric-pressers carried by and movable with the carriage, and fluid-pressure operated means for positioning said fabric-pressers in respect to the core, including a primary fluid-controlling instrumentality, a plurality of secondary fluid-controlling instrumentalities connected therewith, and means operable during the initial movement of the carriage for making said primary fluid-controlling instrumentality active and comprising a bell-crank lever normally in engagement with the carriage and releasable therefrom when the carriage moves out of engagement therewith, and an air-controlling valve juxtaposed to said lever and engageable therewith.

28. A tire-making machine including a tire-building core, a carriage having advancing and receding movements in respect thereto, fabric-pressers carried by and movable with the carriage, and fluid pressure operated means for positioning said fabric-pressers in respect to the core, including a primary fluid-controlling instrumentality, a plurality of secondary fluid-controlling instrumentalities connected therewith, means operable during the initial movement of the carriage for making said primary fluid-controlling instrumentality active and comprising a bell-crank lever normally in engagement with the carriage and releasable therefrom when the carriage moves out of engagement therewith, an air-controlling valve juxtaposed to said lever and engageable therewith, and means for closing the valve when the carriage returns to starting position.

29. A tire-making machine including a tire-building core, a carriage having advancing and receding movements in respect thereto, fabric-pressers carried by and movable with the carriage, and fluid-pressure operated means for positioning said fabric-pressers in respect to the core, including a primary fluid-controlling instrumentality rendered active during one portion of the advancing movement of the carriage, and secondary fluid-pressure controlling instrumentalities connected to the primary instrumentality, and means for rendering the same active during a later stage of the advancing movement of the carriage and comprising companion air-valves, and cooperating means carried by the carriage and valves for automatically opening and closing the same independent of the operation of said primary fluid-pressure controlling instrumentality.

30. A tire-making machine including a tire-building core, a carriage having advancing and receding movements in respect thereto, fabric-pressers carried by and movable with the carriage, and fluid-pressure operated means for positioning said fabric-pressers in respect to the core, including a primary fluid-controlling instrumentality rendered active during one portion of the advancing movement of the carriage, and secondary fluid-pressure controlling instrumentalities connected to the primary instrumentality, and means for rendering the same active during a later stage of the advancing movement of the carriage and comprising companion air-valves, cooperating means carried by the carriage and valves for automatically opening and closing the same independent of the operation of said primary fluid-pressure controlling instrumentality, and comprising trips mounted on the carriage in spaced-apart relation, and mechanism connected with said valves for automatically opening and closing the same when one or another of the trips engages with such mechanism.

31. A tire-making machine including a tire-building core, a carriage having advancing and receding movements in respect thereto, fabric-pressers carried by and movable with the carriage, and fluid-pressure operated means for positioning said fabric-pressers in respect to the core, including a primary fluid-controlling instrumentality rendered active during one portion of the advancing movement of the carriage, secondary fluid-pressure controlling instrumentalities connected to the primary instrumentality, means for rendering the same active during a later stage of the advancing movement of the carriage and comprising companion air-valves, cooperating means carried by the carriage and valve for automatically opening and closing the same independent of the operation of said primary fluid-pressure controlling instrumentality, comprising trips mounted on the carriage in spaced-apart relation, mechanism connected with said valves for automatically opening and closing the same when one or another of the trips engages with such mechanism, one of said trips being operable on said mechanism when the carriage moves in one direction and inactive on such mechanism when the carriage moves in the opposite direction.

32. A tire-making machine including a tire-building core, a carriage having advancing and receding movements in respect thereto, fabric-pressers carried by and movable with the carriage, and fluid-pressure operated means for positioning said fabric-pressers in respect to the core, including a primary fluid-controlling instrumentality rendered active during one portion of the advancing movement of the carriage, and secondary fluid-pressure controlling instrumentalities connected to the primary instrumentality, means for rendering the same active during a later stage of the advancing movement of the carriage and comprising companion air-valves, a bell-crank lever connected to each valve and active thereon to open and close the same, a keeper pivoted on the valve and having a locking engagement with the bell-crank lever, an actuating arm connected to said keeper, a trip on the carriage and engageable by said actuating arm, and a second trip on the carriage and engageable with said bell-crank lever.

33. A tire-making machine including a tire-building core, a carriage having an advancing and receding movement in respect thereto, fabric-pressers mounted on the carriage and movable thereby in respect to the core, means for effecting an advancing movement of the carriage toward the core, carriage driving mechanism, magnetically-operated means for connecting the carriage to and disconnecting the same from the carriage-drive, and means rendered active at one stage of the movement of the carriage for actuating said magnetically-operated means for disconnecting the carriage from its drive.

34. A tire-making machine including a tire-building core, a carriage having an advancing and receding movement in respect thereto, fabric-pressers mounted on the carriage and movable thereby in respect to the core, means for effecting an advancing movement of the carriage toward the core, carriage-driving mechanism, magnetically-operated means for connecting the carriage to and disconnecting the same from the carriage drive, means rendered active at one stage of the movement of the carriage for actuating said magnetically-operated means for disconnecting the carriage from its drive, means for positioning said fabric-pressers toward the core, and means rendered active by the carriage-disengaging means for effecting a movement of the fabric-pressers away from the core.

35. A tire-making machine including a tire-building core, a carriage having an advancing and receding movement in respect thereto, carriage-driving mechanism, magnetically-operated means for connecting the carriage to its driving mechanism, a circuit-controlling device juxtaposed to the carriage, and co-acting means on the carriage and connected to the circuit-controlling device whereby when the carriage reaches a predetermined position in its advancing movement the circuit-controlling device becomes active to effect operation of said magnetically-operated means.

36. A tire-making machine including a tire-building core, a carriage having an advancing and receding movement in respect thereto, carriage-driving mechanism, magnetically-operated means for connecting the carriage to its driving mechanism, a circuit-controlling device juxtaposed to the carriage, co-acting means on the carriage and connected to the circuit-controlling device whereby when the carriage reaches a predetermined position in its advancing movement the circuit-controlling device becomes active to effect operation of said magnetically-operated means, fluid-pressure operated means for positioning said fabric-pressers in respect to the core, and means influenced by said circuit-controlling device to govern the action of said fluid-pressure operated means.

37. A tire-making machine including a tire-building core, a carriage having an advancing and receding movement in respect thereto, carriage-driving mechanism, magnetically-operated means for connecting the carriage to its driving mechanism, a circuit controlling device juxtaposed to the carriage, co-acting means on the carriage and connected to the circuit-controlling device whereby when the carriage reaches a predetermined position in its advancing movement the circuit-controlling device becomes active to effect operation of said magnetically operated means, fluid-pressure operated means for positioning said fabric-pressers in respect to the core, and means influenced by said circuit-controlling device to govern the action of said fluid-pressure operated means, including a solenoid in circuit with said circuit-controlling device, and a fluid-controlling instrumentality juxtaposed to and operated by said solenoid.

38. A tire-making machine including a tire-building core, a carriage having advancing and receding movements in respect thereto, a plurality of trips carried by the carriage, a circuit-controlling device arranged in the path of travel of the trips, one of the trips being fixed to operate said circuit-controlling device when the carriage moves in one direction, the other trip being positionable into and out of engaging position with the circuit-controlling device, carriage-driving mechanism, a magnetic clutch for connecting and disconnecting the carriage to the driving mechanism, and a connection between the circuit-controlling device and the magnetic clutch.

39. A tire-making machine including a tire-building core, a carriage having advancing and receding movements in respect thereto, a plurality of trips carried by the carriage, a circuit-controlling device arranged in the path of travel of the trips, one of the trips being fixed to operate said circuit-controlling device when the carriage moves in one direction, the other trip being positionable into and out of engaging position with the circuit-controlling device, carriage-driving mechanism, a magnetic clutch for connecting and disconnecting the carriage to the driving mechanism, a connection between the circuit-controlling device and the magnetic clutch, fabric-pressers mounted on the carriage, fluid-pressure operated mechanism for actuating said fabric-pressers in respect to the core, means for supplying pressure-fluid to said mechanism, and means connected to said circuit-controlling device for controlling the flow of said pressure-fluid.

40. A tire-making machine including a tire-building core, a carriage having advancing and receding movements in respect thereto, a plurality of trips carried by the carriage, a circuit-controlling device arranged in the path of travel of the trips, one of the trips being fixed to operate said circuit-controlling device when the carriage moves in one direction, the other trip being positionable into and out of engaging position with the circuit-controlling device, carriage-driving mechanism, a magnetic clutch for connecting and disconnecting the carriage to the driving mechanism, a connection between the circuit-controlling device and the magnetic-clutch, fabric-pressers mounted on the carriage, fluid-pressure operated mechanism for actuating said fabric-pressers in respect to the core, means for supplying pressure-fluid to said mechanism, and means connected to said circuit-controlling device for controlling the flow of said pressure-fluid, including a valve and a solenoid for operating the same.

41. A tire-making machine including a tire-core, a presser-support juxtaposed thereto, fabric-pressers on the support and positionable in respect to the core, a fluid-pressure system connected to said fabric-pressers for actuating the same in respect to the core, a stock-supplying structure juxtaposed to the core and connected to said presser-system, and means for controlling the flow of pressure-fluid through said system to said fabric-pressers and to said fabric-supplying structure.

42. A tire-making machine including a tire-core, a presser-support juxtaposed thereto, fabric-pressers on the support, presser-supporting members for positioning the pressers in respect to the core, a fluid-pressure system connected to said presser-supporting members for actuating the same, a fabric-supplying structure including a plurality of fabric-holding rolls positionable in respect to the core, means connected to said rolls and to said fluid-pressure system for positioning one or another of the rolls in relation to the core, and means for controlling the flow of pressure-fluid through the system to actuate said roll-positioning means.

43. A tire-making machine including a tire-core, a presser-support juxtaposed thereto, fabric-pressers on the support, presser-supporting members for positioning the pressers in respect to the core, a fluid-pressure system connected to said presser-supporting members for actuating the same, a fabric-supplying structure including a plurality of fabric-holding rolls positionable in respect to the core, means connected to said rolls and to said fluid-pressure system for positioning one or another of the rolls in relation to the core, means for controlling the flow of pressure-fluid through the system to actuate said roll-positioning means, and manually-operated means for controlling the flow of pressure-fluid through the system to actuate said roll-positioning means.

44. A tire-making machine including a tire-core, a presser-support juxtaposed thereto, fabric-pressers on the support, presser-supporting members for positioning the pressers in respect to the core, a fluid-pressure system connected to said presser-supporting members for actuating the same, a fabric-supplying structure including a plurality of fabric-holding rolls positionable in respect to the core, means connected to said rolls and to said fluid-pressure system for positioning one or another of the rolls in relation to the core, means for controlling the flow of pressure-fluid through the system to actuate said roll-positioning means, manually-operated means for controlling the flow of pressure-fluid through the system to actuate said roll-positioning means, and carriage-operated means for controlling the flow of pressure-fluid through said system to operate the fabric-pressers.

45. A tire-making machine including a tire-building core, a support juxtaposed thereto, a carriage on the support and movable in respect to the core, fabric-pressing mechanism on the carriage and positionable thereby in respect to the core, and tread-laying mechanism also mounted on the support and positionable in respect to the core independently of the operation of the carriage, comprising a roll-supporting device, tread-rolls supported in said device, racks to which the rolls are connected, and lever-operated mechanism for actuating said racks to juxtapose the rolls in respect to the core.

46. A tire-making machine including a tire-building core, a support juxtaposed thereto, a fabric-pressing mechanism on the support including swinging arms, fabric-pressers carried by the arms and positionable thereby in respect to the core, and vibration-preventing devices disposed in the path of the swinging movement of the arms.

47. A tire-making machine including a tire-building core, a support juxtaposed thereto, a fabric-pressing mechanism on the support including swinging arms, fabric-pressers carried by the arms and positionable thereby in respect to the core, and vibration-preventing devices disposed in the path of the swinging movement of the arms, including a bracket mounted on the support, an arm pivoted on the bracket, and a spring active on the same.

48. A tire-making machine including a tire-building core, a support juxtaposed thereto, a fabric-pressing mechanism on the support including swinging arms, fabric-pressers carried by the arms and positionable thereby in respect to the core, and vibration-preventing devices disposed in the path of the swinging movement of the arms, including a bracket mounted on the support, an arm pivoted on the bracket, a spring active on the same, and means for varying the tension of said spring to control different degrees of vibration imposed thereon by the swinging arms.

49. A machine for making tires including a tire-forming core, a carriage movable in relation thereto, fabric-stitching devices on the carriage, fluid-pressure-operated means for actuating the devices both toward and away from the core, and means independent of the fluid-pressure-operated means for moving the carriage toward and away from the core.

50. A machine for making tires including a tire-forming core, a carriage movable in relation thereto, fabric-stitching devices on the carriage, fluid-pressure-operated means for actuating the devices both toward and away from the core, means independent of the fluid-pressure-operated means for moving the carriage toward and away from the core, and means operated during the travel of the carriage for arresting its travel and also actuating one of said pressure-operated means.

51. A machine for making tires including a tire-forming core, a carriage movable in relation thereto, fabric-stitching devices on the carriage, fluid-pressure-operated means for actuating the devices both toward and away from the core, means independent of the fluid-pressure-operated means for moving the carriage toward and away from the core, and means for normally locking the stitching-devices against movement toward the core.

52. A machine for making tires including a tire-forming core, a carriage movable in relation thereto, fabric-stitching devices on the carriage, fluid-pressure-operated means for actuating the devices both toward and away from the core, means independent of the fluid-pressure-operated means for moving the carriage toward and away from the core, and means for normally locking the stitching-devices against movement toward the core, such locking means becoming operative when the stitching-devices have been swung away from the core.

53. A machine for making tires including a tire-forming core, a carriage movable in relation thereto, fabric-stitching devices on the carriage, fluid-pressure-operated means for actuating the devices both toward and away from the core, means operating independently of the fluid-pressure-operated means and having a normal tendency to press the stitcher-devices toward the core, and means independent of the fluid-pressure-operated means for moving the carriage toward and away from the core.

54. A machine for making tires including a tire-forming core, a carriage movable in relation thereto, fabric-stitching devices on the carriage and having a swinging movement toward the core and a spreading-apart movement away from the core, fluid-pressure-operated means for actuating the devices both toward and away from the core, and means independent of the fluid-pressure-operated means for moving the carriage toward and away from the core.

55. A machine for making tires including a tire-forming core, a carriage movable in relation thereto, fabric-stitching devices on the carriage and having a swinging movement toward the core and a spreading-apart movement away from the core, fluid-pressure-operated means for actuating the devices both toward and away from the core, means independent of the fluid-pressure-operated means for moving the carriage toward and away from the core, and means for automatically controlling the flow of pressure-fluid to the pressure-operated means.

56. A tire-making machine including a tire-forming core, swinging members, fabric-stitching devices movably mounted on the members, fluid-pressure operated means active on the swinging members to move them and the stitching devices toward the core, and fluid-pressure operated means active on the stitching devices for moving them on the swinging members and in relation to the core.

57. A tire-making machine including a tire-forming core, a carriage movable in relation thereto, fabric-stitching devices movable on the carriage in respect to the core, a pressure-fluid system associated therewith, fluid-pressure-operated means connected therewith for actuating the stitcher devices, a primary device for controlling the flow of pressure-fluid through the system; secondary devices for controlling the flow of the fluid to the pressure-operated means, and means whereby movement of the carriage controls said pressure-fluid devices.

58. A tire-making machine including a tire-forming core, a carriage movable in relation thereto, fabric-stitching devices movable on the carriage in respect to the core, a pressure-fluid system associated therewith, fluid-pressure-operated means connected therewith for actuating the stitcher devices, a primary device for controlling the flow of pressure-fluid through the system, secondary devices for controlling the flow of the fluid to the pressure-operated means, means whereby movement of the carriage controls said pressure-fluid devices, means for operating the primary-device during one portion of the advancing movement of the carriage, and independent means for operating the secondary devices at a later stage of said movement.

59. A machine for making tires including a tire-forming core, fabric-pressing members mounted on a carrier and movable toward and from said core, carriage-driving mechanism, and magnetically-operated means controlled by the movement of the carriage to disconnect said carriage driving mechanism at a desired point in the travel of the carriage.

60. A machine for making tires including a tire-forming core, fabric-pressing members mounted on a carriage and movable toward and from said core, carriage-driving mechanism, magnetically-operated means controlled by the movement of the carriage to disconnect said carriage driving mechanism at a desired point in the travel of the carriage, and means rendered active by the same means as controls the carriage-disengaging means for effecting a movement of the fabric-pressing members away from the core.

61. A machine for making tires including a tire-forming core, fabric-pressing members mounted on a carriage and movable toward and from said core, carriage-driving mechanism, magnetically-operated means controlled by the movement of the carriage to disconnect said carriage driving mechanism at a desired point in the travel of the carriage, an electric circuit including said magnetically-operated means and a solenoid, a circuit-controlling device, and fluid-pressure operated means controlled by the solenoid for effecting movement of the fabric-pressing members.

62. A machine for making tires including a tire-forming core, fabric-pressing members mounted on a carriage and movable toward and from said core, carriage-driving mechanism, magnetically operated means controlled by the movement of the carriage to disconnect said carriage driving mechanism at a desired point in the travel of the carriage, an electric circuit including said magnetically-operated means and a solenoid, a circuit-controlling device, a plurality of members carried by the carriage to cause the completion of the electric circuit which controls the said magnetically-operated means, one of said members being movable into and out of operative position to vary the travel of the carriage, and fluid-pressure-operated means controlled by the solenoid for effecting movement of the fabric-pressing members.

63. A machine for making tires including a tire-forming core, fabric-pressing members movable in relation thereto, a stock-supplying device operatively associated with the core, pressure-fluid operated means for actuating said members and device, and a pressure-fluid system connected to the fluid-pressure-operated means for controlling said fabric-pressing members and stock-supplying device.

64. A machine for making tires including a tire-forming core, fabric-pressing members movable in relation thereto, a stock-supplying device operatively associated with the core, pressure-fluid operated means for actuating said members and device, and a pressure-fluid system connected to the fluid-pressure-operated means for controlling said fabric-pressing members and stock-supplying device, the stock-supplying device including a plurality of fabric-holding rolls adapted to be positioned in relation to the core by the fluid-pressure-operated means.

65. A machine for making tires including a tire-forming core, fabric-pressing members movable in relation thereto, a stock-supplying device operatively associated with the core, pressure-fluid operated means for actuating said members and device, a pressure-fluid system connected to said fluid-pressure-operated means for controlling said fabric-pressing members and stock-supplying device, the stock-supplying device including a plurality of fabric-holding rolls adapted to be positioned in relation to the core by the fluid-pressure-operated means and manually operated means for controlling the flow of pressure-fluid to the fluid-pressure-operated means to actuate the roll-positioning means.

66. A machine for making tires including a tire-forming core, fabric-pressing members movable in relation thereto, a stock-supplying device operatively associated with the core, pressure-fluid operated means for actuating said members and device, a pressure-fluid system connected to fluid-pressure-operated means for controlling said fabric-pressing members and stock-supplying device, the stock-supplying device including a plurality of fabric-holding rolls adapted to be positioned in relation to the core by the fluid-pressure-operated means, and manually-operated means for controlling the flow of pressure-fluid to the fluid-pressure-operated means to actuate the roll-positioning means, in combination with automatic means for controlling the fluid-pressure means which operate the fabric-pressing members.

67. A machine for making tires including a tire-forming core, fabric-pressing members positionable in relation thereto, swinging arms on which the members are mounted, and vibration-preventing devices disposed in the path of the swinging movement of the arms and including a pivoted arm and a spring adapted to be adjustably tensioned for operating on the arm.

68. A tire-making machine including a tire-forming core, a carriage having advancing and receding movements in relation to the core, fabric-pressing mechanism on the carriage and including supporting members and fabric pressers carried thereby, fluid-pressure operated means to swing the members in one direction to shift the pressers toward the core, fluid pressure operated means for spreading said members apart to position the pressers away from the core, and means for regulating the action of the pressers against the core whereby their angle of relation may be changed.

69. A tire-making machine including a tire-forming core, a carriage movable in relation thereto, presser supporting members on the carriage, fabric pressers on the members, fluid pressure operated means for swinging the members in one direction to position the pressers toward the core, fluid-pressure operated means for spreading the members apart to position the pressers away from the core, and automatic means for latching the members and pressers against a further swinging movement.

70. A tire-making machine including a tire-building core, a support juxtaposed thereto, fabric-manipulating mechanism on the support and positionable in relation to the core, fabric-trimming mechanism juxtaposed to said support and normally disengaged from and occupying a position below the plane of the core, and means for positioning said trimming mechanism into and out of operating position with respect to the core, comprising a plurality of swinging arms movable on axes disposed at approximately right angles to the axis of the core, fabric-cutters carried thereby, toggle-levers connected to said arms, and a foot-operated device connected to said toggle-levers whereby its movement in one direction swings said arms toward and positions the cutters into trimming relation with respect to the core.

71. A tire-making machine including a tire-building core rotatable on a approximately horizontal axis, a support juxtaposed to and normally disengaged from the core, trimming mechanism on the support, and means operable at the will of the operator for positioning the trimming mechanism into and out of operating relation with respect to the core and comprising a plurality of swinging members each movable on an axis disposed at an approximately right angle to the axis of the core, fabric-cutters carried by the members, levers connected to the members, and a foot-operated device connected to the levers whereby movement of the device in one direction swings the members toward, and positions the associated cutters into trimming relation with respect to the core.

72. A tire-making machine including a tire-building core, a support juxtaposed thereto fabric-manipulating mechanism on the support and positionable in relation to the core, fabric-trimming mechanism juxtaposed to said support and normally disengaged from the core, means for positioning said trimming mechanism into and out of operating position with respect to the core, comprising a plurality of swinging arms, fabric-cutters carried thereby, toggle-levers connected to said arms, a foot-operated device connected to said toggle-levers whereby its movement in one direction swings said arms toward and positions the cutters into trimming relation with respect to the core, and a stitcher device juxtaposed to the core and associated with the trimming mechanism for action on the core in advance of the actuation of the latter.

73. A tire-building machine including a rotatable core, primary stitcher-instrumentalities associated therewith, a support swingingly associated with the core, an arm swingingly associated with the support, a stitcher device on the arm, operable successively to the action of the primary stitcher-instrumentalities, a trimming device associated with the core and operable successively to the action of the stitcher device, a swinging support on which the trimming device is mounted and by which it is actuated in respect to the core, means for actuating said supports in respect to the core, and resilient means for returning the actuated parts to normal position.

74. A tire-building machine including a rotatable core, stitcher-mechanism associated therewith, and fabric-trimming mechanism associable therewith and including a base, an oscillatable member associated therewith, trimmer-arms pivoted on the member, a knife supporting saddle on each arm, a clamp-member associated with the saddle, trimming-knives adjustable in the clamp-members, means for moving the knives therein, and means for actuating said oscillatable member to position the trimmer-knives in relation to the core.

75. A tire-building machine including a rotatable core, stitcher-mechanism associated therewith, and fabric-trimmer mechanism associable therewith and including a frame-plate, an attaching-base associated therewith, a pair of supporting-arms sustained by the frame-plate, an oscillatable plate-member associated with the arms, a pair of trimmer-arms associated with the plate-member, heads carried by the arms, a knife-supporting saddle on each arm, side-plates forming a part of the saddle and pivotally secured to the head, means for maintaining the saddle at any of a plurality of adjustable positions, clamp-members associated with the side-plates, a trimmer-knife associated with the clamp-member, adjusting means associated therewith for adjusting the knife therein, arm-extensions on the supporting-arms, link-members connected to the extensions, a bar connecting with the link-members, a foot-lever connected to the bar, and resilient means active on the lever for moving it in one direction.

76. A tire-building machine including a rotatable core, stitcher-mechanism associated therewith, and fabric-trimming mechanism associable therewith and including a frame-plate, an attaching-base associated therewith, a pair of supporting-arms sustained by the frame-plate, an oscillatable plate-member associated with the arms, a pair of trimmer-arms associated with the plate-member, heads carried by the arms, a knife-supporting saddle on each of the arms, side-plates forming a part of the saddle and pivotally secured to the head, means for maintaining the saddle at any of a plurality of adjustable positions, clamp-members associated with the side-plate, a trimmer-knife associated with each clamp-member, adjusting means associated therewith for adjusting the knife therein, arm-extensions on the supporting arms, link-members connected to the extensions, a bar connecting with the link-members, a foot-lever connected to the bar, resilient means active on the lever for moving it in one direction, and a guide-rail associated with the plate-member and acting on the foot-lever to control its movement.

77. A tire-making machine including a tire-building core, means for rotating the core including a main drive, a plurality of variable speed-drives connected to the core and connectible with the main drive, magnetic clutches for connecting the variable speed-drives to the main drive, and automatic means for stopping the core after it has completed a single rotation including a brake, an electrical contact apparatus, and connections between said apparatus and the magnetic clutches, comprising a bell-crank lever, a trip engageable therewith, a contact carried by the bell-crank, and cooperating contact-fingers engageable with the contact on the bell-crank lever.

78. A tire-building machine including a core, a fabric-pressing structure operatively associated therewith, a fabric-supplying structure also associated with the core and electro-pneumatic automatically controlled mechanism for operating each of said structures.

79. A tire-building machine including a core, a fabric-pressing structure associated therewith, a fabric-supplying structure also associated with the core, electro-pneumatic automatically controlled mechanism for operating each of said structures and means operable at the will of the operator for setting said mechanism into action for operating the different structures as required.

In witness whereof, we have hereunto signed our names.

WILLIAM B. HARSEL.
THE GOODYEAR TIRE AND RUBBER COMPANY,
By WILLIAM D. SHILTS,
*Asst. Secretary, for Edward Nall, Deceased.*